US012479983B2

United States Patent
Yasumoto et al.

(10) Patent No.: US 12,479,983 B2
(45) Date of Patent: Nov. 25, 2025

(54) PACKAGED MOLDED ARTICLE, CROSSLINKING RUBBER COMPOSITION, METHOD FOR PRODUCING PACKAGED MOLDED ARTICLE, METHOD FOR PRODUCING CROSSLINKING RUBBER COMPOSITION, AND TREAD FOR TIRE

(71) Applicant: Asahi Kasei Kabushiki Kaisha, Tokyo (JP)

(72) Inventors: Atsushi Yasumoto, Tokyo (JP); Tsuneaki Konomoto, Tokyo (JP); Hideki Yamasaki, Tokyo (JP); Yoshifumi Araki, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 482 days.

(21) Appl. No.: 18/014,413

(22) PCT Filed: Aug. 6, 2021

(86) PCT No.: PCT/JP2021/029399
§ 371 (c)(1),
(2) Date: Jan. 4, 2023

(87) PCT Pub. No.: WO2022/034865
PCT Pub. Date: Feb. 17, 2022

(65) Prior Publication Data
US 2023/0257560 A1    Aug. 17, 2023

(30) Foreign Application Priority Data

Aug. 11, 2020 (JP) .................................. 2020-135808
Sep. 28, 2020 (JP) .................................. 2020-161630

(51) Int. Cl.
*B65D 81/26* (2006.01)
*B60C 1/00* (2006.01)
*C08L 21/00* (2006.01)

(52) U.S. Cl.
CPC ............. *C08L 21/00* (2013.01); *B60C 1/0016* (2013.01); *B65D 81/26* (2013.01); *C08L 2312/00* (2013.01)

(58) Field of Classification Search
CPC ...... B65D 81/26; B65D 81/70; B60C 1/0016; B60C 1/00
See application file for complete search history.

(56) References Cited

U.S. PATENT DOCUMENTS

| 5,672,406 A | 9/1997 | Challis et al. |
| 2015/0321823 A1 | 11/2015 | Balasubramanian et al. |

(Continued)

FOREIGN PATENT DOCUMENTS

| JP | S59-126983 U | 8/1984 |
| JP | S62-158670 A | 7/1987 |

(Continued)

OTHER PUBLICATIONS

Translation of JP 2002-145348 (Year: 2002).*

(Continued)

*Primary Examiner* — Robert C Boyle
(74) *Attorney, Agent, or Firm* — Morgan, Lewis & Bockius LLP

(57) ABSTRACT

A packaged molded article containing: a molded article of a rubber-like polymer having a weight average molecular weight of 100,000 or more, and a packaging film packaging the molded article, wherein a portion facing the molded article, of the packaging film, satisfies the following conditions (1) and (2): <Condition (1)> the portion has 50 or more openings; <Condition (2)> a total area ratio of the openings (Continued)

is 0.1% or more and 15% or less with respect to a total area of the portion facing the molded article.

17 Claims, 2 Drawing Sheets

(56) References Cited

U.S. PATENT DOCUMENTS

| | | | |
|---|---|---|---|
| 2018/0037674 | A1 | 2/2018 | Yamada et al. |
| 2019/0203021 | A1 | 7/2019 | Kyo et al. |

FOREIGN PATENT DOCUMENTS

| | | | |
|---|---|---|---|
| JP | H05-254570 | A | 10/1993 |
| JP | 2002-145348 | * | 5/2002 |
| JP | 2002-145348 | A | 5/2002 |
| JP | 2003-002356 | A | 1/2003 |
| JP | 2004-099064 | A | 4/2004 |
| JP | 2012-062072 | A | 3/2012 |
| JP | 2013-133419 | A | 7/2013 |
| JP | 5690918 | B2 | 3/2015 |
| JP | 2015-189503 | A | 11/2015 |
| JP | 2019-206723 | A | 12/2019 |
| JP | 2020-050708 | A | 4/2020 |
| KR | 10-2004-0062951 | A | 7/2004 |
| KR | 10-2019-0030216 | A | 3/2019 |
| RU | 2110460 | C | 5/1998 |
| RU | 94954 | U | 6/2010 |
| RU | 161043 | U | 4/2016 |
| WO | 2004/028241 | A1 | 4/2004 |
| WO | 2014/099396 | A1 | 6/2014 |
| WO | 2019/151127 | A1 | 8/2019 |

OTHER PUBLICATIONS

International Preliminary Report on Patentability and Written Opinion issued in corresponding International Patent Application No. PCT/JP2021/029399 dated Oct. 19, 2021.
Partial Supplementary European Search Report issued in European Patent Application No. 21855944.1 dated Jan. 5, 2024.
Supplementary European Search Report issued in European Patent Application No. 21855944.1 dated Mar. 27, 2024.
International Search Report (with partial translation) and Written Opinion dated Oct. 19, 2021, for corresponding International Patent Application No. PCT/JP2021/029399.

* cited by examiner

PACKAGED MOLDED ARTICLE, CROSSLINKING RUBBER COMPOSITION, METHOD FOR PRODUCING PACKAGED MOLDED ARTICLE, METHOD FOR PRODUCING CROSSLINKING RUBBER COMPOSITION, AND TREAD FOR TIRE

TECHNICAL FIELD

The present invention relates to a packaged molded article, a crosslinking rubber composition, a method for producing a packaged molded article, a method for producing a crosslinking rubber composition, and a tread for a tire.

BACKGROUND ART

A rubber-like polymer has been conventionally known to be difficult to pelletize because of having plasticity, tackiness, and the like. Thus, the rubber-like polymer is often handled in the form of a packaged molded article obtained by forming the polymer into a molded article having a rectangular parallelepiped shape or the like and furthermore packaging the molded article with a packaging film, in order to be easily stored and conveyed.

Patent Document 1 has proposed a packaged molded article using an embossed packaging film for inhibition of fusion between such packaged molded articles.

Patent Document 2 has described a housing method including adsorbing a synthetic rubber bale packaged, by a vacuum cup, transferring and housing a prescribed number of such bales in a conveyance vessel, and has proposed an article where such synthetic rubber bales are packaged, in which a large number of ventholes regularly aligned in a plastic film on an upper surface of such synthetic rubber bales packaged are provided.

Patent Document 3 has proposed an article where a rectangular parallelepiped-shaped object to be packaged is packaged, in which the position of a seal portion is controlled, as a technique for prevention of damage at a contact portion between a front seal portion and a back seal portion of a packaging film of an article where bales are packaged.

CITATION LIST

Patent Document

Patent Document 1: Japanese Patent Laid-Open No. 2003-2356
Patent Document 2: Japanese Patent Laid-Open No. 2004-99064
Patent Document 3: Japanese Patent No. 5690918

SUMMARY OF INVENTION

Technical Problem

However, in the above conventional techniques, when a rubber-like polymer has a structure hardly cold flowing, condensation generated in a packaging film tends to hardly disappear and likely remain as it is.

A rubber-like polymer covered with the packaging film described above, when packaged and then used as it is for processing a tire or the like, has the problem of involuntarily causing an increase of water in a rubber composition and/or in a molded article thereof if condensation is generated.

An object of the present invention is to provide a packaged molded article where, even if a rubber-like polymer hardly cold flows, condensation easily disappears in a packaging film.

Solution to Problem

The present inventors have made earnest studies to solve the above-described problems of the conventional techniques, resulting in finding the following: a packaged molded article includes a molded article of a specific rubber-like polymer, and a specific packaging film, to thereby allow condensation to easily disappear in the packaging film even if the rubber-like polymer hardly cold flows, and thus the present invention has been accomplished.

Specifically, the present invention provides the following:

[1]

A packaged molded article containing
a molded article of a rubber-like polymer having a weight average molecular weight of 100,000 or more, and
a packaging film packaging the molded article, wherein
a portion facing the molded article, of the packaging film, satisfies the following conditions (1) and (2):
<Condition (1)> the portion has 50 or more openings;
<Condition (2)> a total area ratio of the openings is 0.1% or more and 15% or less with respect to a total area of the portion facing the molded article.

[2]

A packaged molded article containing
a molded article of a rubber-like polymer having a weight average molecular weight of 100,000 or more, and
a packaging film packaging the molded article, wherein
a portion facing the molded article, of the packaging film, has openings, and a total area ratio of the openings is 0.1% or more and 15% or less with respect to a total area of the portion facing the molded article, and
an area ratio of a portion not having any openings of 1 mm$^2$ or more per 10,000 mm$^2$ of the packaging film is 70% or less with respect to a total area of the portion facing the molded article.

[3]

The packaged molded article according to [1] or [2], wherein
the rubber-like polymer has a structure represented by (R—B), (R—B—R), or (R—B)$_n$—X,
R/B (mass ratio) in the rubber-like polymer is 30/70 to 97/3, and
the rubber-like polymer has a Mooney viscosity (ML$_{1+4}$ (100° C.)) of 40 or more;
wherein, R represents a conjugated diene polymer block, a random copolymer block of vinyl aromatic hydrocarbon and conjugated diene, or a hydrogenated product block of the conjugated diene polymer block or random copolymer block, B represents a vinyl aromatic hydrocarbon polymer block, n represents an integer of 1 or more, and X represents a residue of a coupling agent or a modifier.

[4]

The packaged molded article according to any one of [1] to [3], wherein the rubber-like polymer has a Mooney relaxation ratio (MSR) of 0.8 or less.

[5]

The packaged molded article according to any one of [1] to [4], wherein the openings each have a circular or ellipsoidal shape.

[6]
The packaged molded article according to any one of [1] to [5], wherein the packaging film satisfies the following conditions (3) and (4):
<Condition (3)> the packaging film has 100 or more openings in the portion facing the molded article;
<Condition (4)> a total area of the openings is 500 mm² or more and 50,000 mm² or less.

[7]
The packaged molded article according to any one of [1] to [6], wherein the rubber-like polymer contains a nitrogen atom.

[8]
The packaged molded article according to any one of [1] to [7], wherein the rubber-like polymer has a modification ratio measured by column adsorption GPC of 40% by mass or more.

[9]
The packaged molded article according to any one of [1] to [8], wherein the rubber-like polymer has an iodine value of 10 to 250, and 3% by mass or more of an ethylene structure.

[10]
The packaged molded article according to any one of [1] to [9], wherein
  a molded article of the rubber-like polymer is a rectangular parallelepiped, and
  the packaging film faces at least three surfaces of the rectangular parallelepiped and has openings in each of the surfaces.

[11]
The packaged molded article according to any one of [1] to [10], wherein
  the packaging film is a monolayer film formed from one selected from the group consisting of a polyethylene resin, a polystyrene resin, a nylon resin, a polyethylene terephthalate resin and an ethylene vinyl alcohol copolymer, or a multilayer film formed from two or more selected from the group.

[12]
The packaged molded article according to any one of [1] to [11], wherein the packaging film has a water vapor transmission rate at 40° C. and 90% RH of 5 g/m²·d or more.

[13]
A crosslinking rubber composition as a mixture of
  the packaged molded article according to any one of [1] to [12], and
  0.1 parts by mass or more and 20 parts by mass or less of a crosslinking agent with respect to a total amount of 100 parts by mass of a rubber component in the packaged molded article.

[14]
A method for producing a packaged molded article, containing
  a step of polymerizing a monomer in a solution to obtain a solution containing a rubber-like polymer having a weight average molecular weight of 100,000 or more,
  a step of removing a solvent from the solution containing the rubber-like polymer,
  a step of molding the rubber-like polymer to obtain a molded article, and
  a step of covering the molded article with a packaging film, wherein
  a portion facing the molded article, of the packaging film, satisfies the following conditions (1) and (2):
<Condition (1)> the portion has 50 or more openings,
<Condition (2)> a total area ratio of the openings is 0.1% or more and 15% or less with respect to a total area of the portion facing the molded article.

[15]
A method for producing a crosslinking rubber composition, containing
  a step of processing the packaged molded article according to any one of [1] to [12] without peeling of the packaging film contained in the packaged molded article.

[16]
A tread for a tire, containing the packaged molded article according to any one of [1] to [12], or the crosslinking rubber composition according to [13].

Advantageous Effect of Invention

According to the present invention, a packaged molded article is obtained where, even if a rubber-like polymer hardly cold flows, condensation easily disappears in a packaging film.

DESCRIPTION OF EMBODIMENTS

Figure 1:
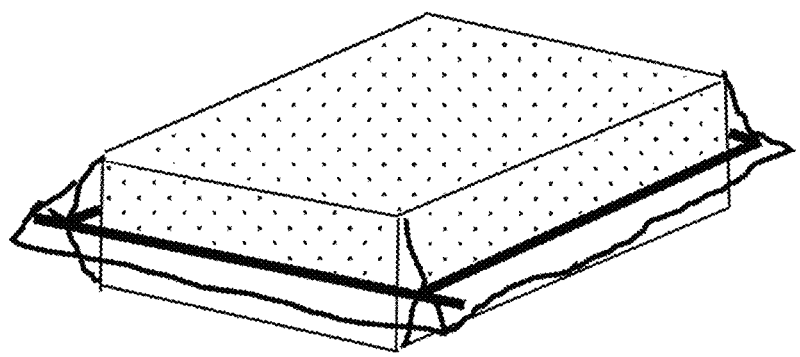
FIG. 1 A schematic view illustrating a case where a film having openings and a film having no openings are respectively used on an upper surface and a lower surface of a molded article, and the molded article is packaged with such two films and four side surfaces are heat sealed.

Now, an embodiment for practicing the present invention (hereinafter, referred to as the "present embodiment".) will be described in detail.

It is noted that the following embodiment is merely illustrative for describing the present invention, and that the present invention is not intended to be limited to the following content and the present invention can be practiced with various modifications appropriately made within the scope thereof.

[Packaged Molded Article]

A packaged molded article of the present embodiment includes
  a molded article of a rubber-like polymer having a weight average molecular weight of 100,000 or more, and
  a packaging film packaging the molded article.

A portion facing the molded article, of the packaging film, satisfies the following conditions (1) and (2):

<Condition (1)> the portion has 50 or more openings,
<Condition (2)> a total area ratio of the openings is 0.1% or more and 15% or less with respect to a total area of the portion facing the molded article.

The above configuration provides a packaged molded article where condensation easily disappears in a packaging film.

The "portion facing the molded article" herein refers to a portion of the packaging film, which faces the molded article as an object to be packaged when the molded article is packaged with a packaging film, and also encompasses both states where the portion is in contact with and not in contact with the molded article. It is noted that the "portion facing the molded article" does not include the area of a portion of the packaging film, the portion being sealed in packaging.

(Rubber-Like Polymer)

The packaged molded article of the present embodiment includes a molded article of a rubber-like polymer having a weight average molecular weight of 100,000 or more (hereinafter, sometimes simply designated as "molded article".).

When a weight average molecular weight of the rubber-like polymer is 100,000 or more, the molded article tends to hardly cold flows. In a case where the rubber-like polymer is a so-called block copolymer, a weight average molecular weight of 100,000 or more allows the inhibition effect of cold flow of the molded article, and in a case where the rubber-like polymer is a random copolymer, a weight average molecular weight of 200,000 or more is preferable from the viewpoint of inhibition of cold flow.

<Weight Average Molecular Weight of Rubber-Like Polymer>

While the rubber-like polymer may or may not have an ethylene structure, the rubber-like polymer, when has an ethylene structure, is increased in Mooney viscosity described below even if low in weight average molecular weight, and thus the rubber-like polymer having an ethylene structure and the rubber-like polymer having no ethylene structure are different in preferable weight average molecular weight range in the packaged molded article of the present embodiment.

Herein, the "ethylene structure" means a structure formed by polymerization of ethylene. The "ethylene structure" itself is formed by a single bond, and does not include any double bond unlike ethylene or the like. Accordingly, the "ethylene structure" herein is not limited to any structure formed with being directly derived from ethylene. For example, a structure obtained by hydrogenation after polymerization of butadiene by 1,4-binding also corresponds to the "ethylene structure".

The rubber-like polymer preferably has no ethylene structure because cold flow tends to hardly occur at a weight average molecular weight of 300,000 or more. In such a case, a weight average molecular weight of the rubber-like polymer is more preferably 400,000 or more, further preferably 600,000 or more, still further preferably 800,000 or more. In this regard, the weight average molecular weight is preferably 1,300,000 or less, more preferably 1,000,000 or less from the viewpoints of moldability of the rubber-like polymer, and adhesiveness between a packaging film and the molded article.

The rubber-like polymer, if has an ethylene structure, tends to hardly cold flow, when has a weight average molecular weight of 100,000 or more, and the weight average molecular weight is preferably 300,000 or more, and more preferably 350,000 or more. On the other hand, the weight average molecular weight is preferably 800,000 or less, and more preferably 600,000 or less from the viewpoints of moldability of the rubber-like polymer, and adhesiveness between a packaging film and the molded article.

The rubber-like polymer having no ethylene structure and the rubber-like polymer having an ethylene structure, serving as the rubber-like polymer contained in the packaged molded article of the present embodiment, while are different in preferable weight average molecular weight, as described above, are the same in molecular weight distribution, content of a vinyl aromatic monomer unit, content of a vinyl aromatic monomer block, vinyl bond content, glass transition temperature, Mooney relaxation ratio, Mooney viscosity, modifier, modification ratio, coupling agent, branched structure, and preferable conditions of addition of an additive after a polymerization process, a method for removing a solvent from a polymer solution, and a method for molding the rubber-like polymer.

The rubber-like polymer contained in the molded article in the packaged molded article of the present embodiment may have any structure represented by R, $(R)_n$—X, R—B, R—B—R, or $(R—B)_n$—X.

In each formula, R represents a conjugated diene polymer block, a random copolymer block of vinyl aromatic hydrocarbon and conjugated diene, or a hydrogenated product block of the conjugated diene polymer block or random copolymer block, B represents a vinyl aromatic hydrocarbon polymer block, n represents an integer of 1 or more, and X represents a residue of a coupling agent or a modifier.

The rubber-like polymer, which has such any structure, hardly cold flows as compared with a random polymer and a conjugated diene polymer each having no vinyl aromatic hydrocarbon polymer block represented by B, and thus a packaged molded article where a molded article of the rubber-like polymer having such any structure is packaged tends to include condensation. The size and the proportion of the vinyl aromatic hydrocarbon polymer block represented by B tend to have an influence on ease of cold flow of the rubber-like polymer.

A random polymer having no vinyl aromatic hydrocarbon polymer block represented by B is one containing less than 2% by mass of B, and in this case, B is assumed not to be contained and the structure is designated as R or $(R)_n$—X.

In the structure of the rubber-like polymer used in the present embodiment, R may represent any of a conjugated diene polymer block, a random copolymer block of vinyl aromatic hydrocarbon and conjugated diene, or a hydrogenated product block of the conjugated diene polymer block or random copolymer block. A microstructure is not particularly limited, and each monomer-derived structure may be uniformly distributed or may be distributed in a taper, stepwise, convexed or concaved manner. Such each distribution system may plurally coexist.

In the present embodiment, R and B in the rubber-like polymer may be distributed in a complete block manner, or may be distributed in a so-called taper block manner so that the vinyl aromatic hydrocarbon bond content is continuously increased from in R toward in B. In such a case, such a taper moiety is contained in R.

The R/B (mass ratio) in the rubber-like polymer used in the packaged molded article of the present embodiment is preferably 97/3 or less, more preferably 95/5 or less, and further preferably 90/10 or less, from the viewpoint of storage stability of the molded article at ordinary temperature. In this regard, the R/B (mass ratio) is preferably 30/70 or more, more preferably 35/65 or more, and further preferably 40/60 or more, from the viewpoint of moldability.

In $(R—B)_n$—X, X represents a modifier residue when n is 1, and X represents a coupling agent residue when n is 2 or more. In the formula, n is preferably an integer of 1 to 8, more preferably an integer of 1 to 6, and further preferably an integer of 1 to 4.

The "residue" means a structure moiety made by replacement of a leaving group in the modifier and/or the coupling agent, with a polymerization-active end, and thus elimination of the leaving group, and binding with a polymer. In a case where the coupling agent contains a functional group, such as nitrogen, other than the leaving group, the coupling agent has both a coupling function and a modification function, and X also functions as a modifier residue.

A modification reaction and a coupling reaction tend to be easily performed with a structure where a conjugated diene polymer of a low molecular weight or a random copolymer of low molecular weight conjugated diene and vinyl aromatic hydrocarbon is bound to a vinyl aromatic hydrocarbon polymer block end of the vinyl aromatic hydrocarbon polymer block represented by B, the end being bound to a coupling agent or modifier X.

The vinyl aromatic hydrocarbon polymer block refers to a block including a chain of eight or more vinyl aromatic hydrocarbon monomer units.

The form of the vinyl aromatic hydrocarbon polymer block is not particularly limited, and specifically, for example, when the rubber-like polymer is a butadiene-styrene copolymer, the polymer can be decomposed by Kolthoff method (method described in I. M. KOLTHOFF, et al., J. Polym. Sci. 1,429 (1946)) and an amount of polystyrene insoluble in methanol can be analyzed. As another method, a known method, as described in International Publication No. WO2014/133097, such as measurement of a chain of styrene units by NMR can be employed for the measurement.

In the present embodiment, the proportion of the vinyl aromatic hydrocarbon polymer block represented by B and the proportion of the conjugated diene polymer block represented by R, the random copolymer block of vinyl aromatic hydrocarbon and conjugated diene, or the hydrogenated product block of the conjugated diene polymer block or random copolymer block can be measured by a method described in Examples below.

The vinyl aromatic hydrocarbon polymer block content of the rubber-like polymer can be controlled to fall in the above-described numerical range by a method for adding a monomer, addition of a polymerization aid, a polymerization temperature, and the like.

<Molecular Weight Distribution>

From the viewpoint of fuel economy in use of the packaged molded article of the present embodiment, for a material of a tire, a molecular weight distribution (=weight average molecular weight/number average molecular weight) of the rubber-like polymer is preferably 2.0 or less, more preferably 1.8 or less, and further preferably 1.6 or less. On the other hand, from the viewpoint of processability of a rubber composition using the rubber-like polymer, the molecular weight distribution is preferably 1.05 or more, more preferably 1.2 or more, further preferably 1.4 or more.

The weight average molecular weight and the molecular weight distribution of the rubber-like polymer can be calculated based on a molecular weight in terms of polystyrene measured by GPC (gel permeation chromatography).

The weight average molecular weight and the molecular weight distribution can be controlled to fall in the above-described numerical ranges by adjusting the polymerization temperature in the polymerization process, and a polar compound, a coupling agent and the like added in polymerization.

<Content of Vinyl Aromatic Monomer Unit>

A content of the vinyl aromatic monomer unit in the rubber-like polymer is preferably 5% by mass or more, more preferably 10% by mass or more, further preferably 15% by mass or more, and still further preferably 20% by mass or more from the viewpoints of resistance to deformation of a molded article during transport, and break strength and wet skid resistance obtained in use in a tire tread.

On the other hand, from the viewpoints of cuttability in measurement of a molded article in the shape of a sheet or the shape of a block, and adhesiveness of a packaging film and difficulty of breakage of a packaging film, and from the viewpoints of fuel economy and abrasion resistance obtained in use in a tire tread, the content is preferably 45% by mass or less, more preferably 30% by mass or less, and further preferably 25% by mass or less.

If a high modulus is required as in a run flat tire member or the like, the content is preferably 30% by mass or more.

<Vinyl Aromatic Monomer Block>

The vinyl aromatic monomer block content in the rubber-like polymer is preferably less than 10% by mass.

The vinyl aromatic monomer block refers to a block including a chain of eight or more vinyl aromatic monomer units.

When the vinyl aromatic monomer block content is less than 10% by mass, moldability of the rubber-like polymer or a rubber composition using the polymer to a molded article in the shape of a sheet or the shape of a block, adhesiveness of a packaging film, and cuttability in measurement of a molded article in the shape of a sheet or the shape of a block tend to be excellent.

The vinyl aromatic monomer block content is more preferably 7% by mass or less, further preferably 5% by mass or less, and still further preferably 3% by mass or less.

From the viewpoint of flexibility of the rubber-like polymer and a rubber composition using the polymer, the number of vinyl aromatic monomer blocks each including a chain of 30 or more vinyl aromatic monomer units is preferably small or zero. The vinyl aromatic monomer block content can be specifically measured, for example, when the rubber-like polymer is a butadiene-styrene copolymer, by decomposing the polymer by Kolthoff method (method described in I. M. KOLTHOFF, et al., J. Polym. Sci. 1,429 (1946)) to analyze an amount of polystyrene insoluble in methanol.

Examples of another method include a known method, as described in International Publication No. WO2014/133097, such as measurement of a chain of styrene units by NMR.

The vinyl aromatic monomer block content of the rubber-like polymer can be controlled to fall in the above-described numerical range by adjusting a method for adding a vinyl aromatic monomer, an amount of addition of a polymerization aid, a polymerization temperature, and the like.

<Vinyl Bond Content>

The vinyl bond content (which is a vinyl bond content of a conjugated diene monomer unit before hydrogenation when the rubber-like polymer is hydrogenated and produced) in the conjugated diene monomer unit in the rubber-like polymer is preferably 10% by mol or more, and more preferably 20% by mol or more, from the viewpoints of productivity of the rubber-like polymer and high wet skid resistance obtained in use in a material of a tire.

From the viewpoint of mechanical strength obtained in use in a material of a tire, the vinyl bond content is preferably 75% by mol or less, more preferably 60% by mol or less, further preferably 45% by mol or less, and still further preferably 30% by mol or less.

The vinyl bond content of the rubber-like polymer can be controlled to fall in the above-described numerical range by adjusting the polymerization temperature, and the type, the amount of compounding, and the like of a polar compound added in polymerization.

The vinyl bond content can be measured by a NMR measurement method.

<Glass Transition Temperature>

A glass transition temperature of the rubber-like polymer is preferably −90° C. or more, more preferably −80° C. or more, and further preferably −75° C. or more, from the viewpoints of resistance to deformation in vibration during transport of the packaged molded article, and tensile strength of a crosslinking rubber composition containing the rubber-like polymer.

On the other hand, from the viewpoints of flexibility of a crosslinking rubber composition containing the rubber-like polymer, and cut resistance of a packaging film, the glass transition temperature is preferably 0° C. or less, more preferably −15° C. or less, further preferably −30° C. or less, and still further preferably −40° C. or less.

With respect to the glass transition temperature of the rubber-like polymer, a peak top (an inflection point) of a DSC differential curve obtained by recording a DSC curve during temperature increase in a prescribed temperature range in accordance with ISO 22768: 2006 is defined as the glass transition temperature of the rubber-like polymer.

<Mooney Relaxation Ratio>

A Mooney relaxation ratio (MSR) measured at 100° C., of the rubber-like polymer as a material of the molded article or a rubber composition using the rubber-like polymer, in the packaged molded article of the present embodiment, is preferably 0.8 or less, more preferably 0.7 or less, and further preferably 0.6 or less, from the viewpoint of blocking resistance of the packaged molded article.

The Mooney relaxation ratio serves as an index of entanglement of molecules contained in the rubber-like polymer, and a lower Mooney relaxation ratio means more entanglement. The Mooney relaxation ratio can be lower by an increase in molecular weight of the rubber-like polymer, an increase in branch number by a coupling agent, a branching agent, and the like, and a decrease in amount of addition of a rubber softener and thus an increase in Mooney viscosity, and can be each controlled to fall in the above-described numerical range by adjusting these conditions.

The Mooney relaxation ratio can be determined by taking a sample from a molded article where a packaging film is removed from the packaged molded article of the present embodiment, preheating the sample at 100° C. for 1 minute, then rotating a rotor at 2 rpm, measuring a Mooney viscosity ($ML_{(1+4)}$ from a torque after 4 minutes, then immediately stopping the rotor, recording a torque every 0.1 seconds between 1.6 seconds and 5 seconds after the stopping, in terms of a Mooney unit, determining the inclination of a line in double logarithmic plotting of the torque and the time (sec), and defining the absolute value of the inclination as the Mooney relaxation ratio.

More specifically, the Mooney relaxation ratio can be measured by a method described in Examples below.

<Mooney Viscosity>

A Mooney viscosity measured at 100° C. of the rubber-like polymer contained in the packaged molded article of the present embodiment, or a rubber composition using the rubber-like polymer is preferably 40 or more, more preferably 50 or more, and further preferably 55 or more, from the viewpoints of resistance to deformation in vibration during transport of the packaged molded article of the present embodiment, and abrasion resistance, stirring stability and break strength obtained when a crosslinking rubber composition containing the rubber-like polymer is used in a tire.

On the other hand, from the viewpoints of productivity of the rubber-like polymer and the rubber composition, and processability obtained in producing a rubber composition with a filler and the like blended, the Mooney viscosity is preferably 170 or less, more preferably 150 or less, further preferably 130 or less, and still further preferably 110 or less.

The Mooney viscosity can be measured by a method prescribed in ISO289.

The Mooney viscosities of the rubber-like polymer and the rubber composition can be controlled to fall in the above-described numerical range by adjusting a molecular weight of the rubber-like polymer, a branch number by a coupling agent, a branching agent, and the like, the molecular weight distribution, a content of a softener, and the like.

<Modification and Modification Ratio>

The rubber-like polymer preferably contains a nitrogen atom and/or a tin atom, more preferably contains a nitrogen atom from the viewpoints of peeling resistance of the rubber-like polymer from the molded article of the rubber-like polymer, resistance to deformation in vibration during transport of the packaged molded article, and fuel economy obtained in use in a material of a tire.

The rubber-like polymer preferably has a modification ratio measured by column adsorption GPC of 40% by mass or more, more preferably 60% by mass or more, and further preferably 70% by mass or more from the viewpoint of, in addition to the above-described performances, dispersibility of silica in use as a silica-containing material for a tire.

Herein, the "modification ratio" refers to a mass ratio of a polymer having a nitrogen atom-containing functional group with respect to the total amount of the rubber-like polymer.

A position where a nitrogen atom is introduced in the rubber-like polymer may be any one of a polymerization starting end, a molecular chain (including a graft product), and a polymerization end of the rubber-like polymer.

The modification ratio can be controlled to fall in the above-described numerical range by adjusting a polymerization temperature, and an amount of a modifier added in a modification process during polymerization.

In a case where the rubber-like polymer is a modified polymer, a modification group is preferably introduced with a coupling agent containing a tin atom or a nitrogen atom from the viewpoints of polymerization productivity, a high modification ratio, and abrasion resistance and fuel economy obtained in use in a material of a tire. A nitrogen atom is more preferably introduced in particular with a coupling agent containing a nitrogen atom.

As a coupling agent containing a nitrogen atom, from the viewpoints of polymerization productivity and a high modification ratio, an isocyanate compound, an isothiocyanate compound, an isocyanuric acid derivative, a nitrogen group-containing carbonyl compound, a nitrogen group-containing vinyl compound, a nitrogen group-containing epoxy compound, a nitrogen group-containing alkoxysilane compound and the like are preferred.

Among these coupling agents containing a nitrogen atom, from the viewpoints of polymerization productivity of the rubber-like polymer, a high modification ratio, and tensile strength obtained in use in a material of a tire, a nitrogen group-containing alkoxysilane compound is more preferred.

Examples of the nitrogen atom-containing alkoxysilane compound include, but are not limited to, 2,2-dimethoxy- 1-(3-trimethoxysilylpropyl)-1-aza-2-silacyclopentane, 2,2-diethoxy-1-(3-triethoxysilylpropyl)-1-aza-2-silacyclopentane, 2,2-dimethoxy-1-(4-trimethoxysilylbutyl)-1-aza-2-silacyclohexane, 2,2-dimethoxy-1-(5-trimethoxysilylpentyl)-1-aza-2-silacycloheptane, 2,2-dimethoxy-1-(3-dimethoxymethylsilylpropyl)-1-aza-2-silacyclopentane, 2,2-diethoxy-1-(3-diethoxyethylsilylpropyl)-1-aza-2-silacyclopentane, 2-methoxy,2-methyl-1-(3-trimethoxysilylpropyl)-1-aza-2-silacyclopentane, 2-ethoxy,2-ethyl-1-(3-triethoxysilylpropyl)-1-aza-2-silacyclopentane, 2-methoxy,2-methyl-1-(3-dimethoxymethylsilylpropyl)-1-aza-2-silacyclopentane, and 2-ethoxy,2-ethyl-1-(3-diethoxyethylsilylpropyl)-1-aza-2-silacyclopentane, tris(3-trimethoxysilylpropyl)amine, tris(3-methyldimethoxysilylpropyl)amine, tris(3-triethoxysilylpropyl)amine, tris(3-methyldiethoxysilylpropyl)amine, tris(trimethoxysilylmethyl)amine, tris(2-trimethoxysilylethyl)amine, and tris(4-trimethoxysilylbutyl)amine, tetrakis[3-(2,2-dimethoxy-1-aza-2-silacyclopentane)propyl]-1,3-propanediamine, tetrakis(3-trimethoxysilylpropyl)-1,3-propanediamine, tetrakis(3-trimethoxysilylpropyl)-1,3-bisaminomethylcyclohexane, and $N^1$-(3-(bis(3-(trimethoxysilyl)propyl)amino)propyl)-$N^1$-methyl-$N^3$-(3-(methyl(3-(trimethoxysilyl)propyl)amino)propyl)-$N^3$-(3-(trimethoxysilyl)propyl)-1,3-propanediamine.

<Rubber-Like Polymer Having Ethylene Structure>

The rubber-like polymer used in the molded article contained in the packaged molded article of the present embodiment preferably has an iodine value of 10 to 250 and 3% by mass or more of an ethylene structure (hereinafter, the structure may be designated as "rubber-like polymer having an ethylene structure") from the viewpoint of a low remaining water content of the rubber-like polymer.

The iodine value of the rubber-like polymer having an ethylene structure is preferably 10 or more, more preferably 15 or more, further preferably 30 or more, still further preferably 50 or more, and yet further preferably 70 or more from the viewpoints of adhesiveness of a packaging sheet to the molded article, and ease of crosslinking.

On the other hand, from the viewpoints of resistance to deformation in vibration during transport of the packaged molded article of the present embodiment, weather resistance and resistance to degradation over time of the rubber-like polymer, and mechanical strength and abrasion resistance obtained in the form of a tire, the iodine value of the rubber-like polymer is preferably 250 or less, more preferably 200 or less, further preferably 170 or less, still further preferably 140 or less, yet further preferably 110 or less, and particularly preferably 80 or less.

The iodine value can be measured in accordance with a method described in "JIS K 0070: 1992".

The iodine value is a value, in terms of the weight in grams of iodine, corresponding to an amount of halogen reacting with 100 g of a target substance, and hence the iodine value is expressed in the unit of "g/100 g".

A conjugated diene monomer has a double bond even after polymerization, and thus, for example, if a copolymer of a conjugated diene monomer and a vinyl aromatic monomer is used as the rubber-like polymer in a method for producing the rubber-like polymer described below, the iodine value of the rubber-like polymer is lower when the content of a conjugated diene monomer is lower. Alternatively, if a polymerized product of a conjugated diene monomer is hydrogenated, the iodine value is lower as a hydrogenation rate is higher.

The iodine value of the rubber-like polymer can be controlled to fall in the above-described numerical range by adjusting the amount of a conjugated diene monomer or the like having an unsaturated bond, polymerization conditions such as polymerization time and a polymerization temperature, and conditions employed in hydrogenation process such as a hydrogenation amount and hydrogenation time.

The rubber-like polymer having an ethylene structure preferably 3% by mass or more, more preferably 5% by mass or more, further preferably 30% by mass or more, and still further preferably 40% by mass or more of an ethylene structure, from the viewpoint of mechanical strength.

The rubber-like polymer has preferably 90% by mass or less, more preferably 80% by mass or less, and further preferably 70% by mass or less of an ethylene structure.

When the rubber-like polymer has 90% by mass or less of an ethylene structure, moldability of a rubber composition using the rubber-like polymer to a molded article in the shape of a sheet or the shape of a block, adhesiveness of a packaging film, and rubber elasticity of a rubber composition using the rubber-like polymer tend to be excellent.

In the rubber-like polymer having an ethylene structure, the ethylene structure encompasses various modes of, for example, an ethylene structure obtained by copolymerizing an ethylene monomer, and an ethylene structure obtained by polymerizing a conjugated diene monomer and then hydrogenating the resultant. For example, when a 1,4-butadiene unit is hydrogenated, two ethylene structures are obtained, and when a 1,4-isoprene unit is hydrogenated, one propylene structure and one ethylene structure are obtained.

In the rubber-like polymer having an ethylene structure, the proportion of the ethylene structure can be measured by a method described in Examples below, and can be controlled to fall in the above-described numerical range by adjusting an amount of ethylene added, an amount of a conjugated diene monomer added, a hydrogenation rate, and the like.

The rubber-like polymer having an ethylene structure preferably contains a monomer unit having an unsaturated group, such as a conjugated diene monomer unit or a myrcene, in a content of 2% by mass or more. From the viewpoints of economic efficiency and productivity, it is more preferable to contain a conjugated diene monomer unit.

A conjugated diene monomer unit or a myrcene contained as a component of the rubber-like polymer having an ethylene structure has a double bond, and thus serves as a crosslinkable unsaturated group.

The content of the monomer unit having an unsaturated group, such as a conjugated diene monomer unit or a myrcene, in the rubber-like polymer having an ethylene structure is closely related to the above-described iodine value.

When the content of the monomer unit having an unsaturated group, such as a conjugated diene monomer unit or a myrcene, is 2% by mass or more, the resultant is excellent in ease of crosslinking. The content of the monomer unit having an unsaturated group, such as a conjugated diene monomer unit or a myrcene, is more preferably 3% by mass or more, and further preferably 6% by mass or more.

The content of the monomer unit having an unsaturated group, such as a conjugated diene monomer unit or a myrcene, is preferably 50% by mass or less, more preferably 30% by mass or less, and further preferably 20% by mass or less. In such a case, weather resistance and resistance to degradation over time tend to be excellent.

The monomer unit having an unsaturated group, such as a conjugated diene monomer unit or a myrcene, is in particular preferably a conjugated diene monomer unit from the viewpoints of economic efficiency and productivity.

The content of the monomer unit having an unsaturated group, such as a conjugated diene monomer unit or a myrcene, in the rubber-like polymer having an ethylene structure can be measured by a method described in Examples below, and can be controlled to fall in the above-described numerical range by adjusting an amount of a monomer having an unsaturated group, such as a conjugated diene monomer or a myrcene, added, described below, and a hydrogenation rate of a conjugated diene monomer.

(Method for Producing Rubber-Like Polymer)

The rubber-like polymer used in the molded article contained in the packaged molded article of the present embodiment is obtained by polymerizing or copolymerizing at least a conjugated diene monomer, or polymerizing or copolymerizing at least a conjugated diene monomer and then hydrogenating some or most of double bonds of a polymer, or copolymerizing at least ethylene and other monomer.

<Polymerization Step>

Examples of a preferable method for polymerizing or copolymerizing at least a conjugated diene monomer include, but are not limited to, a method including polymerizing a conjugated diene monomer by anion polymerization with various additives under various conditions, as described in Japanese Patent Laid-Open No. 2005-290355, Japanese Patent Laid-Open No. H11-189616, Japanese Patent Laid-Open No. 2003-171418, and International Publication No. WO07/114203.

Examples of a preferable method for polymerizing or copolymerizing at least a conjugated diene monomer and then hydrogenating the resultant include, but are not limited to, a method including polymerizing a conjugated diene monomer by anion polymerization with various additives under various conditions and hydrogenating the resultant, if necessary, after copolymerization with other monomer, as described in International Publication No. WO96/05250, Japanese Patent Laid-Open No. 2000-053706, International Publication No. WO2003/085010, International Publication No. WO2019/151126, International Publication No. WO2019/151127, International Publication No. WO2002/002663, and International Publication No. WO2015/006179.

Examples of a preferable method for copolymerizing at least ethylene and a conjugated diene monomer include, but are not limited to, a method including adding and copolymerizing ethylene, a conjugated diene monomer and, if necessary, other monomer by coordination polymerization with various additives under various conditions, as described in International Publication No. WO2019/078083, International Publication No. WO2019/171679, and International Publication No. WO2019/142501.

Preferable examples of the conjugated diene monomer usable in the polymerization process include, but are not limited to, 1,3-butadiene, isoprene, 2,3-dimethyl-1,3-butadiene, 1,3-pentadiene, 3-methyl-1,3-pentadiene, 1,3-hexadiene, and 1,3-heptadiene. Among these, from the viewpoint of industrial availability, 1,3-butadiene and isoprene are preferred, and 1,3-butadiene is more preferred.

One of these may be singly used, or two or more of these may be used together.

A vinyl aromatic monomer can be used as a vinyl aromatic monomer in the polymerization process. Preferable examples of the vinyl aromatic monomer include, but are not limited to, styrene, p-methylstyrene, α-methylstyrene, vinyl ethylbenzene, vinyl xylene, vinyl naphthalene, diphenylethylene, vinylbenzyldimethylamine, (4-vinylbenzyl)dimethylaminoethyl ether, N,N-dimethylaminoethylstyrene, N,N-dimethylaminomethylstyrene, and tertiary amino group-containing diphenylethylene (for example, 1-(4-N,N-dimethylaminophenyl)-1-phenylethylene). Among these, from the viewpoint of industrial availability, styrene is preferred.

One of these may be singly used, or two or more of these may be used together.

Preferable examples of the additional monomer usable in the polymerization process include, but are not limited to, unsaturated carboxylic acid ester, unsaturated carboxylic acid, an α,β-unsaturated nitrile compound, α-olefin (such as butylene, propylene, butylene, pentene, and hexene), ethylene, myrcene, ethylidene norbornene, isopropylidene norbornene, cyclopentadiene, and divinyl benzene.

The polymerization process and the hydrogenation process can be each performed by a batch method or a continuous method.

Distributions in the rubber-like polymer of the hydrogenation rate, and the monomers such as ethylene, the conjugated diene monomer and the vinyl aromatic monomer are not especially limited but these may be uniformly present, non-uniformly present, or present with a distribution.

<Addition of Additive after Polymerization Process>

Any additive such as a deactivator or neutralizer is preferably added after the polymerization process of the rubber-like polymer, from the viewpoint that an amount of metal in a rubber composition using the rubber-like polymer can be easily adjusted to a prescribed amount.

Examples of the deactivating agent include, but are not limited to, water; and alcohols such as methanol, ethanol, and isopropanol.

Examples of the neutralizer include, but are not limited to, carboxylic acids such as stearic acid, oleic acid, and versatic acid (a carboxylic acid mixture having 9 to 11 carbon atoms, mainly 10 carbon atoms, and having many branches); an aqueous solution of an inorganic acid, and carbon dioxide gas.

After the polymerization process of the rubber-like polymer, a rubber stabilizer is preferably added from the viewpoints of prevention of gel formation and processing stability.

As the rubber stabilizer, any of known stabilizers, not limited to the following, can be used, and antioxidants such as 2,6-di-tert-butyl-4-hydroxytoluene, n-octadecyl-3-(4'-hydroxy-3',5'-di-tert-butylphenol)propionate, and 2-methyl-4,6-bis[(octylthio)methyl]phenol are preferred.

For improving moldability of the rubber-like polymer and processability obtained in blending an inorganic filler and the like in producing a tire after the polymerization process of the rubber-like polymer, a rubber softener may be, if necessary, added.

If the rubber-like polymer has a high molecular weight, for example, if the weight average molecular weight exceeds 1,000,000, the rubber softener is preferably used in an amount of 15 to 30% by mass. On the other hand, if the rubber composition contains a filler blended therein, the rubber softener is preferably used in an amount of 1 to 15% by mass in order that the degree of blending freedom is increased.

The content of the rubber softener in the rubber-like polymer is more preferably 20% by mass or less, further preferably 10% by mass or less, and still further preferably 5% by mass or less from the viewpoint of inhibiting degradation over time caused in a tire containing the rubber-like polymer.

The rubber softener is not especially limited, and examples include an extender oil, a liquid rubber, and a resin.

From the viewpoints of processability, productivity, and economic efficiency, the rubber softener is preferably an extender oil.

Preferable examples of a method for adding the rubber softener to the rubber-like polymer include, but are not limited to the following, a method in which the rubber softener is added to and mixed with a solution of the rubber-like polymer, and the thus obtained rubber softener-containing rubber-like polymer solution is desolvated.

Preferable examples of the extender oil include an aromatic oil, a naphthenic oil, and a paraffin oil.

Among these, from the viewpoint of environmental safety, and from the viewpoints of oil bleed prevention and wet grip characteristics, an aroma substitute oil containing 3% by mass or less of a polycyclic aromatic (PCA) component in accordance with the IP 346 method is preferred.

Examples of the aroma substitute oil include TDAE (Treated Distillate Aromatic Extracts) and MES (Mild Extraction Solvate) described in Kautschuk Gummi Kunststoffe 52 (12) 799 (1999), and RAE (Residual Aromatic Extracts).

An additional additive other than the above can be, if necessary, further added to the rubber-like polymer.

As such an additive, a filler, a tackifier or the like described below can be added in a process performed before molding. In this case, the amount of the additive is preferably 15% by mass or less.

<Method for Removing Solvent from Polymer Solution>

Examples of a method for removing the solvent from the polymer solution in a method for producing the rubber-like polymer include a method using flushing, steam stripping, a drying conveyer after dehydrogenation, a devolatilizing extruder, a drum dryer, or a devolatilizing kneader.

From the viewpoints that thermal history is small and that the amount of metal in a rubber composition using the rubber-like polymer can be easily adjusted to a desired amount, a method using at least steam stripping is preferred.

Examples of a steam stripping method and a method of a treatment performed before or after include methods described in Japanese Patent Laid-Open No. 10-168101, Japanese Patent Laid-Open No. 10-204136, International Publication No. WO2013/146530, and Japanese Patent Laid-Open No. 2019-131810.

In the method for producing the rubber-like polymer, at a previous stage of performing an extruding/drying step, a step of desolvating a solvent from the polymer solution by steam stripping, and a screening step of taking out, from a slurry of the rubber-like polymer, a water-containing crumb by separating from stripping water are preferably performed.

In a previous stage of the steam stripping, a flushing step may be performed for increasing the concentration of the solution.

When the desolvating step of removing the solvent from the rubber-like polymer solution by steam stripping is performed at a previous stage of the extruding/drying step, a slurry in which porous granular crumbs not containing the solvent but containing water are dispersed in hot water is obtained.

When the screening step of taking out, from the slurry of the rubber-like polymer, the water-containing crumb by separating from stripping water is performed, a porous granular crumb containing water can be obtained.

Besides, a squeezing dehydration step for performing dehydration with a roll, a screw compression squeezer or the like is preferably performed if necessary. Through such a dehydration step, a water-containing crumb in which the water content has been reduced can be obtained at the previous stage of the extruding/drying step.

After the steam stripping, as described in International Publication No. WO2013/146530, a method for extruding/drying and drying with hot air is preferably performed. In this manner, a porous granular crumb can be obtained.

A particle size of the crumb of the rubber-like polymer is preferably 0.1 mm or more, and more preferably 0.5 mm or more, from the viewpoint of ensuring release resistance of the rubber composition from the molded article and scattering resistance in drying. On the other hand, the particle size of the crumb is preferably 30 mm or less, and more preferably 20 mm or less, from the viewpoints of a drying property of the solvent remaining in the crumb and the water, and swelling resistance of a molded article obtained by molding the rubber composition using the rubber-like polymer.

Examples of a method for controlling the particle size of the crumb to fall in the above-described numerical range include a case where the solvent is removed and the crumb is produced, and a method for controlling by processing the produced crumb.

When the particle size is controlled during process where the solvent is removed and the crumb is produced, a method to be employed is not especially limited, and for example, a method in which the molecular weight, the composition or the structure of the polymer is adjusted, a method in which the amount of the rubber softener to be added to the polymer solution is adjusted, a method in which a hole size of a die of an extrusion dryer is adjusted, or a method in which conditions for desolvation performed with the polymer solution put in hot water are adjusted can be employed.

When the particle size is adjusted by processing the latter produced crumb, a method to be employed is not especially limited, and for example, a method in which the crumb is sieved, or a method in which the crumb is ground and crushed with a mixer or a granulator can be employed.

A specific surface area of the crumb is preferably 0.7 to 3.2 $m^2/g$, and more preferably 1.0 to 3.0 $m^2/g$ from the viewpoint of handleability.

When the specific surface area of the crumb is 0.7 $m^2/g$ or more, an area where one crumb is in close contact with other crumbs present around a molded article, in molding, is increased, and hence the crumb is difficult to peel off from the molded article.

When the specific surface area of the crumb is 3.2 $m^2/g$ or less, crumb particles, in molding, are compressed at a high density to reduce gaps among the crumbs, and hence expansion of the molded article can be inhibited.

A method for controlling the specific surface area of the crumb to fall in the above-described range is not especially limited, and for example, a method in which the crumbs of the rubber-like polymer are sieved to adjust the composition of each group of sieved crumbs can be employed.

The amount of the solvent remaining in the rubber-like polymer in the packaged molded article of the present embodiment, or in only the rubber-like polymer is preferably smaller from the viewpoints of an odor and VOC reduction. The amount of the remaining solvent is preferably 5,000 ppm or less, more preferably 3,000 ppm or less, and further preferably 1,500 ppm or less. From the viewpoint of balance in economic efficiency, the amount is preferably 50 ppm or more, more preferably 150 ppm or more, and further preferably 300 ppm or more.

The water content of the rubber-like polymer in the packaged molded article of the present embodiment, or in only the rubber-like polymer is preferably 0.05% by mass or more and 1.5% by mass or less. From the viewpoint of reducing condensation in the molded article of the rubber-like polymer in the packaged molded article of the present embodiment, the water content relative to the rubber-like polymer is preferably 1.5% by mass or less, more preferably 1% by mass or less, and further preferably 0.9% by mass or less. On the other hand, the water content of the rubber-like polymer is preferably 0.05% by mass or more, more preferably 0.08% by mass or more, further preferably 0.1% by mass or more, and still further preferably 0.2% by mass or more from the viewpoints of inhibiting gel in drying after solvent removal and inhibiting degradation of rubber.

In other words, condensation in the molded article of the rubber-like polymer in the packaged molded article can be inhibited more simply by a reduction in water content of the rubber-like polymer, and in such a case, conditions in a step of desolvating the solvent of the rubber-like polymer are required to be stringent, and gel in the rubber-like polymer tends to be easily increased. From such viewpoints, it is preferable for not only maintaining quality of the rubber-like polymer, but also solving the problems of condensation, that, while a dehydration step is adopted which leads to remaining of water in the molded article of the rubber-like polymer, a packaging form where water vapor and condensation generated in storage of the molded article of the rubber-like polymer disappear by aeration is employed.

On the other hand, from the viewpoints of inhibition of condensation of the rubber-like polymer and discoloration resistance, the water content is preferably 1.5% by mass or less, more preferably 1.0% by mass or less, and further preferably 0.8% by mass or less.

(Method for Molding Rubber-Like Polymer Used in Packaged Molded Article)

The rubber-like polymer for use in the packaged molded article of the present embodiment is preferably molded in the shape of a sheet or the shape of a block from the viewpoint of handleability.

The molded article of the rubber-like polymer is more preferably in the shape of a block, and a block of 1,000 cm$^3$ or more is further preferred and a rectangular parallelepiped block of 15 kg to 40 kg is more preferred.

The size of the molded article is not particularly limited, and is, for example, suitably a size having a width of about 300 to 400 mm, a length of about 600 to 800 mm and a height of about 100 to 300 mm.

The molded article of the rubber-like polymer is preferably molded by a method in which crumbs having a specific surface area of 0.7 m$^2$/g to 3.2 m$^2$/g are produced and the resultant crumbs are compression molded.

From the viewpoint of moldability, it is preferably to perform a step of sieving the crumbs before molding.

Since the crumbs are in close contact with one another in the compression molding of the crumbs, a specific surface area of the molded article is small as compared with the specific surface area of the crumbs. The close contact among the crumbs in the compression molding can be controlled by adjusting the molecular weight, the composition and the structure of the rubber-like polymer, the composition of the rubber softener, and a temperature and a pressure employed in the compression. For example, if the specific surface area of the molded article is to be reduced by increasing the close contact among the crumbs, it is preferable to apply a condition of reducing the molecular weight of the rubber-like polymer, reducing the molecular weight of the rubber softener, or increasing the temperature and the pressure in the compression.

The specific surface area of the molded article of the rubber-like polymer contained in the packaged molded article of the present embodiment is preferably 0.005 to 0.05 m$^2$/g, and more preferably 0.01 to 0.04 m$^2$/g from the viewpoint of a packaging property of the packaging film.

The specific surface area of the molded article is preferably 0.005 m$^2$/g or more because expansion of the molded article can be thus inhibited, and the specific surface area of the molded article is preferably 0.05 m$^2$/g or less because the crumbs peeling off from the molded article can be thus reduced.

The specific surface area of the molded article can be obtained by a BET method.

In general, the specific surface area of a big molded article may be varied depending on the position of the molded article, and hence, a sample for specific surface area measurement is preferably taken in a portion near the center of the molded article.

The crumbs are preferably sieved into respective particle sizes, before being molded, to be mixed in an appropriate quantitative ratio, in a process for producing the molded article of the rubber-like polymer.

If the specific surface area of the molded article molded by directly using the crumbs resulting from the desolvation is over the upper limit of the above-described range, it is preferable to increase, among the sieved crumbs, a composition of crumbs having a large particle size and to reduce a composition of crumbs having a small particle size. If the specific surface area is smaller than the lower limit, it is preferable to reduce the composition of crumbs having a large particle size and to increase the composition of crumbs having a small particle size.

A molding compression pressure in production of the molded article of the rubber-like polymer is preferably 3 to 30 MPa, and more preferably 10 to 20 MPa.

When the compression pressure in molding is 30 MPa or less, an apparatus to be used can be designed to be compact, and hence installation efficiency is enhanced.

When the compression pressure in the molding is 3 MPa or more, good moldability is obtained.

When good moldability is obtained, there is a tendency that the surface of the resultant molded article is smooth, that the rubber-like polymer is not peeled off after the molding step, and that expansion otherwise caused after the molding is inhibited.

A temperature of the rubber-like polymer in the molding is preferably 30 to 150° C., and from the viewpoints of reducing a residual solvent and inhibiting thermal deterioration, is more preferably 50 to 100° C.

The temperature of the rubber-like polymer in the molding is preferably 30° C. or more because good moldability is obtained, and on the other hand, the temperature is preferably 150° C. or less because gel formation otherwise caused by thermal deterioration of the rubber-like polymer can be thus inhibited.

As the temperature and the pressure in the molding are higher, a specific surface area of the resultant molded article is smaller.

A pressure holding time in the molding is preferably 3 to 30 seconds, and more preferably 5 to 20 seconds. When the pressure holding time in the compression is 30 seconds or less, good production efficiency is obtained, and when it is 5 seconds or more, good moldability is obtained.

(Method for Producing Packaged Molded Article)

A method for producing a packaged molded article of the present embodiment includes a step of polymerizing a monomer in a solution to obtain a solution including a rubber-like polymer having a weight average molecular weight of 100,000 or more, a step of removing a solvent from the solution including the rubber-like polymer, a step of molding the rubber-like polymer to obtain a molded article, and a step of covering the molded article with a packaging film, wherein a portion facing the molded article, of the packaging film, satisfies the following conditions (1) and (2):

<Condition (1)> the portion has 50 or more openings,

<Condition (2)> a total area ratio of the openings is 0.1% or more and 15% or less with respect to a total area of the portion facing the molded article.

(Packaging Film)

The packaged molded article of the present embodiment includes the molded article of the rubber-like polymer, and a packaging film packaging the molded article.

The packaging film is a packaging film on a portion facing the molded article, of the rubber-like polymer, in which the film satisfies the conditions (1) and (2), from the viewpoint of the balance among ease of disappearance of condensation in the packaging film, difficulty of blocking of the packaged molded article, and difficulty of breakage of the packaging film in handling.

Herein, the phrase "portion facing the molded article" means a portion of the packaged molded article, where a surface of the molded article of the rubber-like polymer and an inner surface of a film for packaging are directly faced, and the phrase does not encompass any portion not facing the molded article, where film overlapping or adhesion is made for sealing the package.

An object for providing openings in the packaging film of the packaged molded article of the present embodiment is to allow liquid water which can be present between a surface of the molded article of the rubber-like polymer and an inner surface of the packaging film, to be decreased and/or to disappear, and thus the molded article of the rubber-like polymer and the packaging film may or may not be in contact with each other.

It is considered that condensation in the packaging film more easily disappears, as the humidity around the packaged molded article is lower, and openings are provided in the packaging film and thus the effects of circulation of air low in humidity in the packaging film and promotion of disappearance of condensation in the packaging film are exerted.

Examples of the "openings" in the packaging film include holes or slits provided for securement of air permeability between the inside and outside of the packaging film with which the molded article of the rubber-like polymer is covered.

The shapes of openings may be each any shape as long as gas can be circulated between the inside and outside of the packaging film of the packaged molded article, as in holes, slits, and the like, the shapes of openings are each preferably a shape small in ratio between the longest size and the shortest size from the viewpoint of breakage resistance, and circular or ellipsoidal holes are preferred from the viewpoint of economic efficiency.

While slits can also be formed by not opening in a circular or hornlike manner, but cutting by a knife, the resultant openings in such a case are hardly viewed and thus an area of the openings can be calculated by "slit length×knife thickness".

The packaging film may have openings of a plurality of shapes per the packaged molded article of the present embodiment.

The shape and the size of each of the openings are not especially limited, and may be each uniform or different depending on a surface, a position, and the like, and the openings are preferably the same in size and uniformly provided so that the packaging film has both strength and air permeability.

In <Condition (1)>, the packaging film has 50 or more openings, preferably 100 or more openings, and more preferably 500 or more openings, in the portion facing the molded article, per the packaged molded article of the present embodiment, from the viewpoint of ease of disappearance of condensation in the packaging film of the packaged molded article of the present embodiment.

The number of openings is preferably 30,000 or less, more preferably 10,000 or less, further preferably 5,000 or less from the viewpoints of breakage resistance of the packaging film and economic efficiency.

In <Condition (2)>, the total area ratio of the openings is 0.1% or more and 15% or less with respect to a total area of the portion facing the molded article. The "total area ratio of the openings" means the proportion of the total area of the openings in the packaging film facing the molded article of the rubber-like polymer in the total area of the packaging film facing the molded article of the rubber-like polymer.

The total area of the openings per the packaged molded article is preferably 500 $mm^2$ or more, more preferably 1,500 $mm^2$ or more, further preferably 2,500 $mm^2$ or more, still further preferably 3,500 $mm^2$ or more, and yet further preferably 4,500 $mm^2$ or more.

On the other hand, from the viewpoints of difficulty of blocking of the packaged molded article, and breakage resistance of the packaging film in handling of the packaged molded article, the total area of the openings in the packaging film per the packaged molded article is preferably 50,000 $mm^2$ or less, more preferably 30,000 $mm^2$ or less, more preferably 10,000 $mm^2$ or less, and further preferably 8,000 $mm^2$ or less.

In other words, the packaging film of the packaged molded article of the present embodiment preferably satisfies the following conditions (3) and (4):

<Condition (3)> the packaging film has 100 or more openings in the portion facing the molded article;

<Condition (4)> the total area of the openings is 1,000 $mm^2$ or more and 50,000 $mm^2$ or less.

For disappearance of condensation even in the case of storage of such packaged molded articles stacked, the packaging film preferably has openings in portions facing a plurality of surfaces of the molded articles of the rubber-like polymer. Specifically, when such molded articles are each a rectangular parallelepiped, the packaging film preferably faces three or more surfaces of such molded articles, and more preferably faces four or more surfaces of such molded articles.

Such packaged molded articles are generally plurally built up and stored, and thus such three or four portions of the packaging film having openings are preferably located on not upper and lower surfaces which are not aerated in a built up state, but side surfaces. The packaging film having openings more preferably faces five or more surfaces.

Since the molded article of the rubber-like polymer is packaged and then built up, and stored as it is, water vapor stands in a space between such molded articles built up and the packaging film and condensation is generated. More specifically, condensation is generated with an upper surface and side surfaces of a packaged molded article built up at the top stage, and side surfaces of packaged molded article(s) other than the top packaged molded article, serving as passages of water vapor, and thus openings for disappearance of condensation are preferably provided in these surfaces. In other words, the upper surface of the top packaged molded article built up can also be aerated, and thus openings are preferably provided in portions of the packaging film, facing five surfaces including the upper surface and the side surfaces. It is preferable with respect to the packaged molded article(s) other than the top packaged molded article to provide openings in portions of the packaging film, facing four surfaces corresponding to side surfaces. It is noted that no position for building up is determined in packaging and assigning of a packaging form to the top or others is not efficient at all, and thus positions of openings and areas of openings are preferably set so that aeration can be sufficiently made in practical use even if the packaged molded article is built up at any stage.

The average area of the openings of the packaging film is preferably 0.1 $mm^2$ or more, more preferably 1 $mm^2$ or more, and further preferably 4 $mm^2$ or more from the viewpoint of economic efficiency.

On the other hand, the average area is preferably 50 $mm^2$ or less, more preferably 30 $mm^2$ or less, further preferably 10 $mm^2$ or less, and still further preferably 7 $mm^2$ or less from the viewpoints of breakage resistance of the packaging film, difficulty of blocking of the packaged molded article, and handleability of a packaging sheet.

The ratio of the total area of the openings (total area ratio) per the packaged molded article of the present embodiment is 15% or less, preferably 10% or less, more preferably 5% or less, further preferably 1% or less, and still further preferably 0.6% or less with respect to the total area of the portion facing the molded article from the viewpoints of breakage resistance of the packaging film, difficulty of blocking of the packaged molded article, and handleability of a packaging sheet.

The total area ratio of the openings is 0.1% or more, preferably 0.2% or more, more preferably 0.3% or more, and further preferably 0.4% or more with respect to the total area of the portion facing the molded article, from the viewpoint of ease of disappearance of condensation in the packaging film of the packaged molded article. The total area ratio is 15% or less, preferably 12% or less, more preferably 10% or less, and further preferably 8% or less from the viewpoint of prevention of attachment of the molded article of the rubber-like polymer and from the viewpoint of breakage resistance of the packaging film.

An area ratio of a portion not having any openings of 1 $mm^2$ or more per 10,000 $mm^2$ of the packaging film is preferably 70% or less, more preferably 65% or less, and further preferably 60% or less with respect to the total area of the portion facing the molded article, in order to further accelerate disappearance of condensation.

A method for calculating an "area ratio of a portion not having any openings of 1 $mm^2$ or more per 10,000 $mm^2$" is described.

The packaging film packaging the molded article is expanded and partitioned to each square (area 10,000 $mm^2$) of 100 mm×100 mm. While it is not essential to peel the packaging film from the molded article and cut the film, partitioning is made by line-drawing so that each square of 100 mm×100 mm is continuous with a side section bent being discounted as in the case of peeling and expanding. Since the number of squares cut is varied depending on the shape of the packaging film expanded, the packaging film is expanded so as to allow the largest number of squares to be partitioned.

When one or more openings of 1 $mm^2$ or more are present in a certain square packaging film, the entire area of the square is defined as "portion with openings of 1 $mm^2$ or more". On the other hand, when no openings of 1 $mm^2$ or more are present in such a square, the entire area of the square, namely, 10,000 $mm^2$ is defined as "portion without openings of 1 $mm^2$ or more". While a case may occur where line-drawing by 100 mm from each end of the packaging film results in the residue having a length of less than 100 mm at an opposite end, partitioning is made by adjusting the length of other side so that a rectangle having an area of 10,000 $mm^2$ is obtained, and the presence of openings is examined as in the square. If a portion having an area of less than 10,000 $mm^2$ finally remains, calculation is made in consideration of the area of such a portion. For example, when a packaging film is peeled from a packaged molded article having a length of 85 cm, a width of 36 cm and a height of 20 cm and cut and divided, one hundred squares of 100 mm×100 mm and eight rectangles each having an area of 10,000 $mm^2$ can be cut out.

The reason for partitioning to 100 mm×100 mm is because an area, where the effect of accelerating disappearance of condensation per opening of 0.1 $mm^2$ or more and 50 $mm^2$ or less is expected as a result of observation of a condensation condition in storage of the packaged molded article for a certain period, is about 10,000 $mm^2$. In other words, if a portion having no openings provided is present at a width of about 100 mm, in the packaged molded article being stored, condensation often occurs in the portion, and thus it is considered to be effective from the viewpoint of inhibition of condensation to provide openings by such an area.

The shape and the size of the molded article of the rubber-like polymer are not particularly limited, a rectangular parallelepiped is preferred from the viewpoint of a reduction in cost during transport, and one commonly distributed has a size of a length of 50 to 80 cm, a width of 20 to 40 cm, and a height of 10 to 30 cm. The size of the molded article of the rubber-like polymer is, for example, a size of a length of 68 cm, a width of 34 cm, and a height of 18 cm, and when the molded article is packaged, the size of the packaging film after packaging is, for example, a size of a length of 85 cm, a width of 36 cm, and a height of 20 cm. When openings in the packaging film are present on only the lower surface of the molded article of the rubber-like polymer, openings in the packaging film are not present on a portion corresponding to 72% in total of the upper surface and side surfaces of the molded article, and disappearance of condensation is probably insufficient. Thus, openings in the packaging film are preferably present on not only the lower surface, but also the upper surface and side surfaces of the molded article, and the area ratio of a portion having no openings is preferably 70% or less.

Openings in the packaging film are preferably present on the upper surface and side surfaces of the packaged molded article. When such packaged molded articles are stacked and stored, openings in the packaging film are preferably located on side surfaces of such packaged molded articles because such packaged molded articles are in close contact with each other and openings are closed on the upper and lower surfaces of such packaged molded article(s) other than the top packaged molded article to thereby cause disappearance of condensation to be prevented. Thus, condensation can be decreased by circulation between air in the packaging film and the ambient air.

Openings in the packaging film to be used may be openings in a packaging film having openings in advance, or may be openings made with, for example, a needle or an edged tool after production of the packaged molded article. A packaging film having openings in advance is more preferably used from the viewpoint of productivity.

Positions of openings are required to be on a portion of the packaging film, with which the molded article is covered, and are preferably present on a side surface portion of the packaged molded article, where condensation hardly disappears. Openings are preferably arranged at constant intervals from the viewpoint of breakage resistance.

The material of the packaging film is preferably a polyethylene resin, a polystyrene resin, a polypropylene resin, a nylon resin, a polyethylene terephthalate resin, and an ethylene vinyl alcohol copolymer from the viewpoints of adhesiveness to the rubber-like polymer, and mechanical strength.

One of the above materials may be singly used or two or more of the above materials may be used together in the packaging film, and the packaging film may be in the form of a monolayer film or a multilayer film.

A thickness of the packaging film is preferably 10 µm or more, more preferably 20 µm or more, and further preferably 30 µm or more from the viewpoint of breakage resistance. The thickness is preferably 250 µm or less, more preferably 200 µm or less, and further preferably 150 µm or less from the viewpoint of economic efficiency.

The packaging film preferably has transparency at a level so as to be able to confirm the molded article of the rubber-like polymer through the packaging film, from the viewpoint of productivity of the packaged molded article.

The material of the packaging film is preferably a polyethylene resin or a polystyrene resin, and more preferably a polyethylene resin from the viewpoints of compatibility with the rubber-like polymer, and economic efficiency.

Such a polyethylene resin or a polystyrene resin refers to one having 70% by mass or more of an ethylene structure or a styrene structure, and may contain a small amount of other monomer unit structure.

The material of the packaging film is important from the viewpoints of ease of adhesion of the molded article of the rubber-like polymer to the packaging film, handleability in transport of the packaged molded article, and difficulty in occurrence of condensation in a space between the packaging film and the molded article of the rubber-like polymer.

The packaging film has a water vapor transmission rate at 40° C. and 90% RH of preferably 5 g/m²·d or more, more preferably 10 g/m²·d or more, and further preferably 13 g/m²·d or more, from the viewpoint of promotion of condensation decrease during a period of store.

The packaging film having openings is effectively used in order to promote condensation decrease, and even if a packaging film having high water vapor transmission rate is adopted, it is difficult to decrease the amount of condensation generated and allow condensation generated to disappear when no openings satisfying effective area and/or number are provided. When a packaging film having a relatively small number of openings is used, such a packaging film, which has high water vapor transmission rate, can be used to result in tendencies to shorten the time until disappearance of condensation and reduce the amount of condensation generated.

The thickness of the packaging film is preferably 300 µm or less, preferably 200 µm or less, and preferably 100 µm or less from the viewpoint of a reduction in amount of condensation generated. On the other hand, from the viewpoint of prevention of breakage, the thickness is preferably 10 µm or more, more preferably 20 µm or more, and further preferably 30 µm or more, as described above.

In a method for covering the molded article of the rubber-like polymer with the packaging film, the molded article may be wrapped with the packaging film, or the molded article may be packaged with the packaging film formed into a bag.

Examples of a procedure for sealing the packaging film include, but are not limited to, a method for binding with a band or the like made of a polyethylene resin, a method for heat sealing, and a method for sealing with a pressure-sensitive adhesive tape of aluminum foil.

A method for heat sealing is preferred from the viewpoints of productivity and economic efficiency.

In the step of covering the molded article of the rubber-like polymer with the packaging film, one of the packaging film or two or more of the packaging films may be used per the molded article.

For example, when one of the packaging film is used, the packaged molded article can be produced by heat sealing three side surface portions among four side surface portions.

When two of the packaging films are used, the same films may be used or different films may be used. When the molded article is covered with two of the packaging films, the packaged molded article can be produced by, for example, heat sealing four side surface portions.

Such heat sealing may be performed by tight heat sealing, or openings may be formed in any section provided where no heat sealing is partially made, from the viewpoint of air permeability.

FIG. 1 to FIG. 4 illustrate suitable specific examples of a state where the molded article of the rubber-like polymer is packaged with the packaging film.

FIG. 1 illustrates a schematic view of a case where a film having openings and a film having no openings are respectively used on an upper surface and a lower surface of a molded article, and the molded article is packaged with such two films and four side surfaces are heat sealed.

Figure 2:
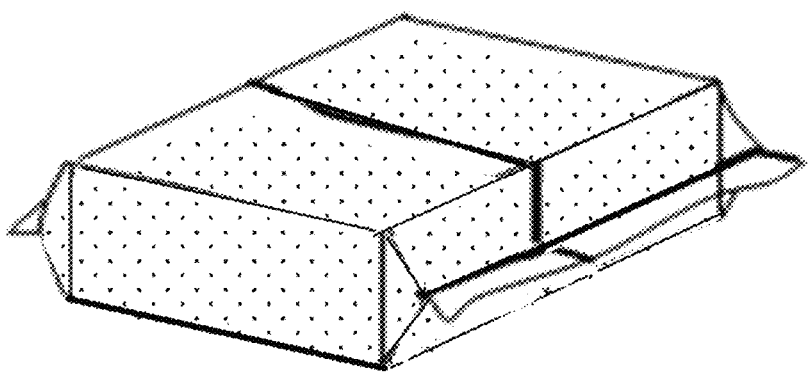
FIG. 2 A schematic view illustrating a case where a molded article is packaged with upper and lower two films each having openings, and one of heat seal portions of four side surfaces is shifted toward an upper surface or a lower surface and three side surfaces are heat sealed.

FIG. 2 illustrates a schematic view of a case where a molded article is packaged with upper and lower two films each having openings, and one of heat seal portions of four side surfaces is shifted toward an upper surface or a lower surface and three side surfaces are heat sealed.

Figure 3:
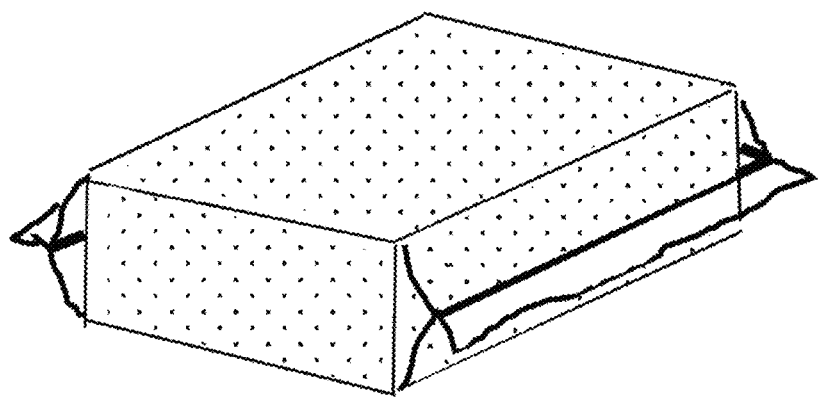
FIG. 3 A schematic view illustrating a case where a molded article is packaged with one film having openings and three side surfaces are heat sealed.

FIG. 3 illustrates a schematic view of a case where a molded article is packaged with one film having openings and three side surfaces are heat sealed.

Figure 4:
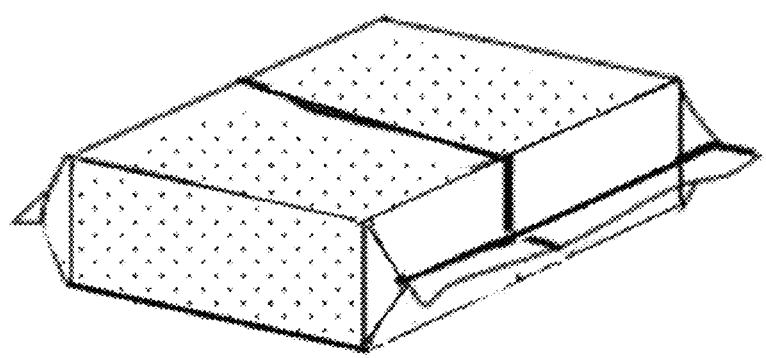
FIG. 4 A schematic view illustrating a case where a molded article is packaged with one film having no openings in an area within 20% from both ends on shorter sides of the film and having openings in an area of 60% corresponding to the central portions of the shorter sides, and three side surfaces are heat sealed.

FIG. 4 illustrates a schematic view of a case where a molded article is packaged with one film having no openings in an area within 20% from both ends on shorter sides of the film and having openings in an area of 60% corresponding to the central portions of the shorter sides, and three side surfaces are heat sealed.

The packaged molded article of the present embodiment can be optionally accommodated in a metallic container, a flexible container, or a packaging bag where a reinforcement layer is laminated.

All such packaged molded articles may be placed in one large plastic film bag so as not to be leaked or moved in such a container or packaging bag.

A cardboard sheet for inhibition of vibration of such packaged molded articles may be placed in such a container or packaging bag.

[Crosslinking Rubber Composition]

A crosslinking rubber composition of the present embodiment is a mixture of the above-described packaged molded article of the present embodiment, and a crosslinking agent.

(Method for Producing Crosslinking Rubber Composition)

From the viewpoints of high mechanical strength and the like, the packaged molded article of the present embodiment is preferably formed into a crosslinking rubber composition by mixing of a crosslinking agent or a crosslinked product by crosslinking, and then used in various applications.

From the viewpoint of productivity of the crosslinking rubber composition, production of the crosslinking rubber composition preferably includes a step of processing the packaged molded article which is still covered with the packaging film, namely, from which no packaging film is peeled.

The crosslinking rubber composition of the present embodiment contains at least the rubber-like polymer described above, and a crosslinking agent, and can further contain, if necessary, an additional rubber component, a filler, and the like.

The additional rubber component is not especially limited, and can be appropriately selected depending on purposes. Examples include a styrene-butadiene rubber (of emulsion polymerization type or solution polymerization type), a natural rubber, polyisoprene, a butadiene rubber, an acrylonitrile-butadiene rubber (NBR), a chloroprene rubber, an ethylene-propylene rubber (EPM), an ethylene-propylene-non-conjugated diene rubber (EPDM), a butyl rubber, a polysulfide rubber, a silicone rubber, a fluororubber, and a urethane rubber.

One of these may be singly used, or a mixture of two or more of these may be used.

A content of the rubber-like polymer used in the packaged molded article of the present embodiment, with respect to a total rubber content in the crosslinking rubber composition, is preferably 20% by mass or more, more preferably 40% by mass or more, further preferably 60% by mass or more, and still further preferably 80% by mass or more.

To the crosslinking rubber composition of the present embodiment, a filler can be added if necessary for purposes of improving a reinforcing property and the like.

An amount of the filler to be blended is not especially limited, and can be appropriately selected depending on purposes, and is preferably 10 to 100 parts by mass, and more preferably 20 to 80 parts by mass with respect to 100 parts by mass of the rubber component.

The "rubber component" here includes the above-described rubber-like polymer and additional rubber component.

When the amount of the filler to be blended is 10 parts by mass or more, the effect of improving a reinforcing property resulting from blending the filler can be obtained. When the amount is 100 parts by mass or less, good processability can be retained with avoiding large deterioration of fuel economy caused in use of the crosslinking rubber composition of the present embodiment, in a tire.

Examples of the filler include, but is not especially limited to, carbon black, silica, aluminum hydroxide, clay, alumina, talc, mica, kaolin, glass balloon, glass bead, calcium carbonate, magnesium carbonate, magnesium hydroxide, magnesium oxide, titanium oxide, potassium titanate, and barium sulfate. Among these, carbon black is preferably used.

One of these may be singly used, or two or more of these may be used together.

The carbon black is not especially limited, and can be appropriately selected depending on purposes, and examples include FEF, GPF, SRF, HAF, N339, IISAF, ISAF, and SAF. One of these may be singly used, or two or more of these may be used together.

A nitrogen adsorption specific surface area ($N_2SA$, measured in accordance with JIS K6217-2: 2001) of the carbon black is not especially limited, and can be appropriately selected depending on purposes.

When the crosslinking rubber composition is used as a material for a fuel efficient tire tread, precipitated silica is suitably contained as the filler.

The crosslinking rubber composition of the present embodiment may contain a silane coupling agent from the viewpoints of improvement of dispersibility of the filler and tensile physical strength of the crosslinked product.

The silane coupling agent is preferably a compound that has a function to make close the interaction between the rubber component and the inorganic filler, has a group having affinity with or a binding property to each of the rubber component and a silica-based inorganic filler, and contains, in one molecule, a sulfur bond portion and an alkoxysilyl group or silanol group portion.

Examples of such a compound include, but are not limited to, bis-[3-(triethoxysilyl)-propyl]-tetrasulfide, bis-[3-(triethoxysilyl)-propyl]-disulfide, bis-[2-(triethoxysilyl)-ethyl]-tetrasulfide, S-[3-(triethoxysilyl)-propyl]octanethioate, a condensate of S-[3-(triethoxysilyl)-propyl]octanethioate and [(triethoxysilyl)-propyl]thiol, and a silane carrying at least one thiol (—SH) functional group (referred to as mercaptosilane) and/or at least one masked thiol group.

A content of the silane coupling agent in the crosslinking rubber composition of the present embodiment is preferably 0.1 parts by mass or more and 30 parts by mass or less, more preferably 0.5 parts by mass or more and 20 parts by mass or less, and further preferably 1.0 part by mass or more and 15 parts by mass or less with respect to 100 parts by mass of the filler.

When the content of the silane coupling agent falls in this range, there is a tendency that the effect attained by the addition of the silane coupling agent can be made further remarkable.

The crosslinking agent used in the crosslinking rubber composition is not especially limited, and can be appropriately selected depending on purposes.

Examples of the crosslinking agent include, but are not limited to, a sulfur-based crosslinking agent, an organic peroxide-based crosslinking agent, an inorganic crosslinking agent, a polyamine crosslinking agent, a resin crosslinking agent, a sulfur compound-based crosslinking agent, and an oxime-nitrosoamine-based crosslinking agent, and one of these may be singly used, or two or more of these may be used together.

When the crosslinking rubber composition of the present embodiment is used in a tire, a sulfur-based crosslinking agent (vulcanizing agent) is more preferred among these, and sulfur is further preferred.

A content of the crosslinking agent in the crosslinking rubber composition of the present embodiment is preferably 0.1 parts by mass or more and 20 parts by mass or less with respect to 100 parts by mass of the rubber component used in the crosslinking rubber composition.

The content of the crosslinking agent is preferably 0.1 parts by mass or more, more preferably 0.5 parts by mass or more, and further preferably 1.5 parts by mass or more with respect to 100 parts by mass of the rubber component from the viewpoints of high tensile strength and crosslinking speed.

On the other hand, from the viewpoints of inhibition of uneven crosslinking and high tensile strength, the content is preferably 20 parts by mass or less, more preferably 5 parts by mass or less, and further preferably 3 parts by mass or less.

In the crosslinking rubber composition of the present embodiment, a vulcanization accelerator may be used in addition to the vulcanizing agent.

Examples of the vulcanization accelerator include guanidine-based, aldehyde-amine-based, aldehyde-ammonia-based, thiazole-based, sulfenamide-based, thiourea-based, thiuram-based, dithiocarbamate-based, and xanthate-based compounds.

The crosslinking rubber composition is included, and in the rubber composition of the present embodiment, in addition to the above-described components, various additives such as additional softener and filler, a heat stabilizer, an antistatic agent, a weathering stabilizer, an anti-aging agent, a colorant, and a lubricant may be used.

As the additional softener, any of known softeners can be used.

Examples of the additional filler include calcium carbonate, magnesium carbonate, aluminum sulfate, and barium sulfate.

As the above-described heat stabilizer, the antistatic agent, the weathering stabilizer, the anti-aging agent, the colorant, and the lubricant, any of known materials can be respectively used.

(Kneading Method for Crosslinking Rubber Composition)

The crosslinking rubber composition of the present embodiment can be produced by mixing the above-described packaged molded article (which may be used, if necessary, with the packaging film being removed by peeling the packaging film of the packaged molded article), the crosslinking agent, and if necessary, the silica-based inorganic filler, the carbon black and another filler, the silane coupling agent, and any additive such as the rubber softener.

While the above-described packaged molded article may be used without no peeling of the packaging film in a step of kneading a plurality of the rubber components, fillers, softeners and the like, from the viewpoint of an enhancement in production efficiency, a problem which can be caused is that droplets due to condensation are present between the molded article of the rubber-like polymer and the packaging film to cause slipping in kneading and then hard application of stress and generation of defective kneading. On the contrary, the packaged molded article of the present embodiment, in which the packaging film having openings are used, thus can allow for substantial reduction in condensation after storage and prevention of defective kneading in a mode of kneading together with the packaging film. Such prevention of defective kneading is preferred also from the viewpoint of no loss in performance originally expected to be exhibited by the rubber-like polymer because the occurrence of defective kneading leads to defective dispersion of the filler and general deterioration in physical properties. Furthermore, disappearance of condensation generated in the packaging film provides the effect of reducing a water content of the crosslinking rubber composition after kneading. Each common rubber-like polymer generally used in a kneading step has a specification set about a water content and is often strictly controlled, and there is also a certain requirement for a water content of a packaged molded article. Such a requirement is generally based on measurement of a state immediately after molding, thus, even if precipitation on a surface of the packaged molded article occurs during storage and condensation is generated, a specification about a water content also including an amount of such condensation is satisfied and a water content of a molded article is rather lower than the specification set above and thus incorporation of condensation is hardly considered to lead to an increase in water content of a kneaded product. However, if condensation is generated in the packaging film, a problem easily caused is that kneading together with the packaging film causes slipping between the packaging film and the molded article as described above and shearing is not favorably applied. The packaged molded article of the present embodiment is designed so that condensation hardly remains in the packaging film, and thus has the advantage of allowing shearing in kneading together with the packaging film to be easily applied.

In the case of use without peeling of the packaging film, a melting point of the packaging film is preferably lower than a temperature in kneading. For example, when the packaging film is used in combination with a rubber-like polymer including diene-based rubber, the temperature in kneading is often 180° C. or less, and the melting point of the packaging film is preferably 50° C. or more and 180° C. or less, preferably 60° C. or more and 170° C. or less, and further preferably 70° C. or more and 160° C. or less.

Examples of a mixing method include, but are not limited to, a melt kneading method using a general mixer such as an open roll, a Banbury mixer, a kneader, a single screw extruder, a double screw extruder, or a multi-screw extruder, and a method in which the respective components are dissolved to be mixed, and then a solvent is removed by heating.

Among these, a melt kneading method using a roll, a Banbury mixer, a kneader or an extruder is preferred from the viewpoints of productivity and good kneadability.

Moreover, any of a method in which the packaged molded article, the crosslinking agent, the filler, the silane coupling agent, and the additives such as the rubber softener are kneaded all at once, and a method in which these are mixed dividedly plural times can be employed.

[Application]

The packaged molded article of the present embodiment, preferably serving as a crosslinking rubber composition, is applicable to, for example, a material for tire members, interiors and exteriors of vehicles, anti-vibration rubbers, belts, shoes (suitably midsoles and outsoles), foam materials, and various industrial products.

In particular, the packaged molded article is suitably used in tire members.

As the tire members, the packaged molded article can be used in, for example, various tires such as a fuel efficient tire, an all-season tire, a high performance tire, a snow tire, and a studless tire; and various portions of a tire such as a tread, a carcass, a sidewall, and a bead portion.

In particular, these compositions are excellent, in the form of a vulcanizate, in balance among abrasion resistance, fuel economy, wet skid resistance, and snow performance, and therefore, are suitably used in a material of a tread for a tire, of a fuel efficient tire, a high performance tire, or a snow tire.

In other words, a tread for a tire of the present embodiment contains the above-described crosslinking rubber composition of the present embodiment.

As a method for producing a tire, any of common methods can be employed.

For example, members usually used for production of a tire, such as at least one carcass layer, belt layer, and tread layer selected from the group consisting of a crosslinking rubber composition before vulcanization and a tire cord, are successively overlayed on a tire forming drum to adhere to one another, and the drum is pulled out to obtain a green tire. Subsequently, the green tire is vulcanized by heating by an ordinary method, and thus, a desired tire, for example, a pneumatic tire can be produced.

EXAMPLES

The present embodiment will now be described in more detail with reference to specific Examples and Comparative Examples, and it is noted that the present embodiment is not limited to the following Examples and Comparative Examples at all.

Various physical properties of the Examples and Comparative Examples were measured by the following methods.

[Physical Properties of Rubber-Like Polymer]
(Mooney Viscosity and Mooney Relaxation Ratio of Rubber-like Polymer)

A rubber-like polymer was used as a sample to measure a Mooney viscosity with a Mooney viscometer (trade name "Mooney viscosity" manufactured by Ueshima Seisakusho Co., Ltd.) using an L rotor in accordance with ISO 289.

A measurement temperature was set to 100° C. A sample was preheated for 1 minute at the test temperature, the rotor was rotated at 2 rpm, and torque was measured after 4 minutes to be defined as a Mooney viscosity ($ML_{(1+4)}$).

Thereafter, rotation of the rotor was immediately stopped, a torque every 0.1 seconds between 1.6 seconds and 5 seconds after the stopping was recorded by a Mooney unit, the inclination of a line in double logarithmic plotting of the torque and the time (sec) was determined, and the absolute value of the inclination was defined as the Mooney relaxation ratio (MSR).

(Weight Average Molecular Weight (Mw) of Rubber-like Polymer)

A chromatogram was measured with a GPC measuring apparatus including a series of three columns using a polystyrene-based gel as a filler, and a weight average molecular weight (Mw) of a rubber-like polymer before hydrogenation was obtained based on a calibration curve obtained using standard polystyrene.

THF (tetrafluoroethylene) containing 5 mmol/L of triethylamine was used as an eluent.

As columns, a guard column: trade name "TSKguardcolumn Super H—H" manufactured by Tosoh Corporation, and columns: trade names "TSKgel Super H5000", "TSKgel Super H6000", and "TSKgel Super H7000" manufactured by Tosoh Corporation were used.

Under conditions of an oven temperature of 40° C. and a THF flow rate of 0.6 mL/min, an RI detector (trade name "HLC8020" manufactured by Tosoh Corporation) was used.

A measurement solution was prepared by dissolving 10 mg of a measurement sample in 20 mL of THF, and 20 μL of the measurement solution was injected into the GPC measuring apparatus for measurement.

(Modification Ratio of Rubber-like Polymer)

A modification ratio of the rubber-like polymer was measured by column adsorption GPC as follows.

The modification ratio was measured by utilizing a characteristic that a rubber-like polymer modified with a nitrogen atom-containing functional group adsorbed on a column.

A sample solution containing a rubber-like polymer and low molecular weight internal standard polystyrene was measured for an amount of adsorption to a silica-based column based on a difference between a chromatogram measured with a polystyrene-based column and a chromatogram measured with a silica-based column, and thus, a modification ratio was obtained.

Specifically, the measurement was performed as follows.
Preparation of Sample Solution:

A sample solution was prepared by dissolving 10 mg of the rubber-like polymer and 5 mg of standard polystyrene in 20 mL of THF.

Gpc Measurement Conditions Using Polystyrene-Based Column:

THF containing 5 mmol/L of triethylamine was used as an eluent, and 20 μL of the sample solution was injected into an apparatus for measurement. As columns, a guard column: trade name "TSKguardcolumn Super H—H" manufactured by Tosoh Corporation and columns: trade names "TSKgel Super H5000", "TSKgel Super H6000", and "TSKgel Super H7000" manufactured by Tosoh Corporation were used.

Under conditions of an oven temperature of 40° C. and a THF flow rate of 0.6 mL/min, an RI detector (trade name "HLC8020" manufactured by Tosoh Corporation) was used for the measurement to obtain a chromatogram.

Gpc Measurement Conditions Using Silica-Based Column:

An apparatus, trade name "HLC-8320GPC" manufactured by Tosoh Corporation was used, THF was used as an eluent, and 50 μL of a sample solution was injected into the apparatus. Under conditions of an oven temperature of 40° C. and a THF flow rate of 0.5 mL/min, an RI detector was used to obtain a chromatogram. As columns, trade names "Zorbax PSM-1000S", "PSM-3005", and "PSM-60S" in series were used, and a column, trade name "DIOL 4.6×12.5 mm 5 micron" was connected as a guard column at a previous stage.

Calculation Method for Modification Ratio:

A modification ratio (%) was obtained in accordance with the following equation assuming that a whole peak area of the chromatogram obtained with the polystyrene-based column is 100, that a peak area of the sample is P1, that a peak area of the standard polystyrene is P2, that a whole peak area of the chromatogram obtained with the silica-based column is 100, that a peak area of the sample is P3, and that a peak area of the standard polystyrene is P4:

$$\text{Modification ratio (\%)}=[1-(P2 \times P3)/(P1 \times P4)] \times 100$$

wherein P1+P2=P3+P4=100.
(Iodine Value of Rubber-like Polymer)

The iodine value of a rubber-like polymer was calculated in accordance with a method described in "JIS K 0070: 1992".

(Amount of Bound Styrene, Amount of Ethylene Structure, and Amount of Conjugated Diene Monomer Unit in Rubber-Like Polymer)

A rubber-like polymer was used as a sample to measure, by 1H-NMR measurement, an amount of bound styrene, an amount of an ethylene structure, and an amount of a conjugated diene monomer unit.

Measurement conditions for the 1H-NMR measurement were as follows:

<Measurement Conditions>
  Apparatus: JNM-LA400 (manufactured by JEOL Ltd.)
  Solvent: deuterated chloroform
  Measurement sample: Rubber-like Polymer
  Sample concentration: 50 mg/mL
  Observation frequency: 400 MHz
  Chemical shift reference: TMS (tetramethylsilane)
  Pulse delay: 2.904 seconds Number of scans: 64
Pulse width: 45°
Measurement temperature: 26° C.
(Content of Styrene Block in Rubber-Like Polymer (Content of Vinyl Aromatic Hydrocarbon Polymer Block))

Assuming that a chain of eight or more styrene structure units is defined as a styrene block, the content was obtained as follows.

Based on a 1H-NMR spectrum at 400 MHz measured with deuterated chloroform used as a solvent, a ratio of an integrated value of the following (X) in each chemical shift range was obtained, and thus, the content (% by mass) of the styrene block contained in the rubber-like polymer was obtained.

(X) Chain of eight or more aromatic vinyl compounds: $6.00 \leq S < 6.68$ (Content of Conjugated Diene Polymer Block in Rubber-Like Polymer, Random Copolymer Block of Vinyl Aromatic Hydrocarbon and Conjugated Diene, or Hydrogenated Product Block of Conjugated Diene Polymer Block or Random Copolymer Block)

A content of a conjugated diene polymer block in a rubber-like polymer, a random copolymer block of vinyl aromatic hydrocarbon and conjugated diene, or a hydrogenated product block of the conjugated diene polymer block or random copolymer block was obtained as follows.

A rubber-like polymer was used to measure, by 1H-NMR measurement, an amount of bound styrene (vinyl aromatic hydrocarbon), a proportion of an ethylene structure, and an amount of a conjugated diene monomer unit, and a difference obtained by removing the ratio of the integrated value (content of styrene block in rubber-like polymer) from the sum of respective ratios of integrated values added was calculated and determined.

(Water Content of Rubber-Like Polymer)

A water content of a rubber-like polymer was obtained by putting 50 g of the rubber-like polymer in a hot air dryer heated to 150° C. to be dried for 3 hours to measure a mass difference of the rubber-like polymer caused by the drying.

(Ratio of Change in Thickness in Cold Flow Test)

A measurement sample of a rubber-like polymer was used and a ratio of change in thickness in a cold flow test was measured.

A sample of 40 mm×40 mm×50 mm thickness (H0) was allowed to stand at 25° C. for 60 minutes with a load of 1 kg and then a thickness (H60) thereof was measured in the cold flow test, and the rate (%) of change in thickness was calculated by the following expression.

Ratio (%) of change in thickness=$(H0-H60) \times 100/H0$

[Evaluation of Packaged Molded Article]
(Evaluation of Adhesion between Bales)

Six rectangular parallelepiped-shaped packaged molded articles, produced in each of Examples and Comparative Examples described below, were closely laminated per stage in five stages in the same direction in a large vessel of an inner dimension of 108 cm×141 cm×95 cm height, and allowed to stand under an environment of a temperature of 23° C. for 4 months.

Thereafter, the packaged molded articles were taken out from the large vessel by a robot, and the presence of adhesion between bales was observed and evaluated.

The "adhesion between bales" here encompasses both adhesion between packaged molded articles and adhesion between a packaging film of one packaged molded article and a molded article in adjacent other packaged molded article.

When the packaged molded articles were taken out from the large vessel by a robot after 4 months in the evaluation, a case where the packaged molded articles could be taken out without adhesion was evaluated as ○, a case where the packaged molded articles, although adhered, could be taken out was evaluated as Δ, and a case where the packaged molded articles were difficult to take out due to the occurrence of adhesion between bales was evaluated as x.

(Evaluation of Breakage Resistance of Film)

Rectangular parallelepiped-shaped packaged molded articles were laminated in a large vessel in the same manner as described above (evaluation of adhesion between bales), and allowed to stand under an environment of a temperature of 23° C. for 4 months.

Thereafter, the presence of break of a film in each of the packaged molded articles taken out from the large vessel by a robot was observed and evaluated.

When the packaged molded articles could not be taken out from the large vessel in the same operation as descried above (evaluation of adhesion between bales), only an upper packaging film on the top stage was observed and evaluated.

In the evaluation, a case where no damage was observed in the packaging film of the packaged molded articles taken out from the large vessel by a robot after 4 months was evaluated as ○, and a case where any damage was observed in the packaging film was evaluated as X.

(Evaluation of Promotion of Disappearance of Condensation)

Rectangular parallelepiped-shaped packaged molded articles were laminated in a large vessel in the same manner as described above (evaluation of adhesion between bales) and allowed to stand under an environment of a temperature of 23° C. for 1 day, and condensation attached on a packaging film facing a molded article side surface of the top packaged molded article at a lapse of 1 day and condensation attached on a packaging film facing the molded article side surface after standing for 1 month were visually observed and evaluated.

In the evaluation, a case where condensation disappeared in condensation observation of the packaging film after 1 month was evaluated as ⊚, a case where condensation did not disappear in condensation observation of the packaging film after 1 month, but an amount of condensation was decreased as compared with that in condensation observation of the packaging film after 1 day was evaluated as ○, and a case where condensation did not disappear in condensation observation of the packaging film after 1 month and condensation comparable with that in condensation observation of the packaging film after 1 day was observed was evaluated as x.

(Evaluation of Film Adhesiveness)

Rectangular parallelepiped-shaped packaged molded articles were laminated in a large vessel in the same manner as described above (evaluation of adhesion between bales) and allowed to stand under an environment of a temperature of 23° C. for 1 month, and thereafter adhesiveness between a molded article and a packaging film in the top packaged molded article was observed and evaluated.

In the packaged molded article after 1 month in the evaluation, a case where adhering between the molded article and the packaging film was observed on not only upper and lower surfaces of the molded article, but also side surfaces of the molded article was evaluated as ⊚, a case where adhering between the molded article and the packaging film was observed on upper and lower surfaces of the molded article was evaluated as ○, and a case where adhering between the molded article and the packaging film was observed on only a lower surface of the molded article was evaluated as Δ.
(Production of Packaged Molded Article)
(Preparation of Hydrogenation Catalyst)

Production Example 1

A nitrogen-substituted reaction vessel was charged with dried and purified cyclohexane, and bis(η5-cyclopentadienyl)titanium dichloride was added thereto. Under sufficient stirring, a n-hexane solution containing trimethyl aluminum was added thereto to be reacted for about 3 days at room temperature, and thus, a hydrogenation catalyst was obtained.
(Molding of Rubber-Like Polymer)
The rubber-like polymer after desolvation was filled in a rectangular parallelepiped vessel having a dimension of a width of 340 mm, a length of 680 mm, and a depth of 250 mm, and compressed by applying a pressure of 3.5 MPa with a cylinder over 10 seconds to obtain a molded article of the rubber-like polymer.
(Packaging of Molded Article of Rubber-Like Polymer)
A packaging film was placed on each of an upper surface and a lower surface of the molded article of the rubber-like polymer obtained in (Molding of Rubber-like Polymer) described above and four side surfaces were heat sealed for packaging, and thus, a packaged molded article was obtained.
(Production of Rubber-Like Polymer)

Polymerization Example 1: Rubber-like Polymer 1

A stainless polymerization reactor was loaded with cyclohexane as a solvent, 1,3-butadiene and styrene as monomers, and tetrahydrofuran (THF) and 2,2-bis(2-oxolanyl)propane as polar substances.
Next, n-butyllithium diluted with cyclohexane, as a polymerization initiator, was loaded, 1,3-butadiene and styrene were copolymerized, and 2,2-dimethoxy-1-(3-trimethoxysilylpropyl)-1-aza-2-silacyclopentane was added to a reactor after two minutes from attainment of a reaction temperature to the maximum point, to perform a coupling reaction.
Methanol as a reaction terminator was added to the polymer solution.
To the solution were added n-octadecyl-3-(3,5-di-t-butyl-4-hydroxyphenyl)-propionate and 4,6-bis(octylthiomethyl)-o-cresol as antioxidants, desolvation was performed by steam stripping, and thus, rubber-like polymer 1 (amount of bound styrene=15% by mass, iodine value=400, Mooney viscosity (ML$_{(1+4)}$ (100° C.))=80, Mooney relaxation ratio=0.50, modification ratio=75% by mass, weight average molecular weight=430,000 g/mol, water content=0.3% by mass) was obtained.
Rubber-like polymer 1 obtained had a random structure represented by (R)$_n$—X (wherein R represented a random copolymer block of vinyl aromatic hydrocarbon and conjugated diene, n was 4, and X represented a residue of a coupling agent or a modifier.).

Polymerization Example 2: Rubber-like Polymer 2

A stainless polymerization reactor was loaded with cyclohexane as a solvent, 1,3-butadiene and styrene as monomers, and tetrahydrofuran (THF) and 2,2-bis(2-oxolanyl)propane as polar substances.
Next, n-butyllithium diluted with cyclohexane, as a polymerization initiator, was loaded, 1,3-butadiene and styrene were copolymerized, and 2,2-dimethoxy-1-(3-trimethoxysilylpropyl)-1-aza-2-silacyclopentane was added to a reactor after two minutes from attainment of a reaction temperature to the maximum point, to perform a coupling reaction.
Methanol as a reaction terminator was added to the polymer solution.
To the solution was added the hydrogenation catalyst prepared in <Production Example 1> described above, and a hydrogenation reaction was performed with addition of hydrogen.
To the solution were added n-octadecyl-3-(3,5-di-t-butyl-4-hydroxyphenyl)-propionate and 4,6-bis(octylthiomethyl)-o-cresol as antioxidants, desolvation was performed by steam stripping, and thus, rubber-like polymer 2 (amount of bound styrene=10% by mass, iodine value=85, Mooney viscosity (ML$_{(1+4)}$ (100° C.))=80, Mooney relaxation ratio=0.45, modification ratio=50% by mass, weight average molecular weight=290,000 g/mol, water content=0.5% by mass) was obtained.
Rubber-like polymer 2 obtained had a random structure represented by (R)$_n$—X (wherein R represented a random copolymer block of vinyl aromatic hydrocarbon and conjugated diene, n was 4, and X represented a residue of a coupling agent or a modifier.).

Polymerization Example 3: Rubber-like Polymer 3

Rubber-like polymer 3 (amount of bound styrene=26% by mass, iodine value=70, Mooney viscosity (ML$_{(1,4)}$ (100° C.))=70, Mooney relaxation ratio=0.52, modification ratio=50% by mass, weight average molecular weight=300,000 g/mol, water content=0.8% by mass) was obtained in the same manner as in <Polymerization Example 2> described above except that amounts of 1,3-butadiene and styrene as monomers, and tetrahydrofuran (THF) and 2,2-bis(2-oxolanyl)propane as polar substances were changed.
Rubber-like polymer 3 obtained had a random structure represented by (R)$_n$—X (wherein R represented a random copolymer block of vinyl aromatic hydrocarbon and conjugated diene, n was 4, and X represented a residue of a coupling agent or a modifier.).

Polymerization Example 4: Rubber-like Polymer 4

Rubber-like polymer 4 (amount of bound styrene=15% by mass, iodine value=400, Mooney viscosity (ML$_{(1,4)}$ (100° C.))=55, Mooney relaxation ratio=0.96, modification ratio=70% by mass, weight average molecular weight=350,000 g/mol, water content=0.8% by mass) was obtained in the same manner as in <Polymerization Example 1> described above except that 3-(4-methylpiperazin-1-yl)propyltriethoxysilane was used as a coupling agent instead of 2,2-dimethoxy-1-(3-trimethoxysilylpropyl)-1-aza-2-silacyclopentane.
Rubber-like polymer 4 obtained had a random structure represented by (R)$_n$—X (wherein R represented a random copolymer block of vinyl aromatic hydrocarbon and conjugated diene, n was 2, and X represented a residue of a coupling agent or a modifier.).

Polymerization Example 5: Rubber-like Polymer 5

Rubber-like polymer 5 (amount of bound styrene=15% by mass, iodine value=400, Mooney viscosity (ML$_{(1,4)}$ (100°

C.))=60, Mooney relaxation ratio=0.67, modification ratio=0% by mass, weight average molecular weight=350,000 g/mol, water content=0.6% by mass) was obtained in the same manner as in <Polymerization Example 1> described above except that silicon tetrachloride was used as a coupling agent instead of 2,2-dimethoxy-1-(3-trimethoxysilylpropyl)-1-aza-2-silacyclopentane.

Rubber-like polymer 5 obtained had a random structure represented by $(R)_n$—X (wherein R represented a random copolymer block of vinyl aromatic hydrocarbon and conjugated diene, n was 4, and X represented a residue of a coupling agent or a modifier.).

Polymerization Example 6: Rubber-like Polymer 6

A stainless polymerization reactor was loaded with cyclohexane as a solvent, 1,3-butadiene and styrene as monomers, and tetrahydrofuran (THF) and 2,2-bis(2-oxolanyl)propane as polar substances.

Next, the polymerization reactor was loaded with n-butyllithium diluted with cyclohexane, as a polymerization initiator, 1,3-butadiene and styrene were copolymerized, 1,3-butadiene as a monomer was additionally added after a certain temperature rise, furthermore styrene as a monomer was added after two minutes from attainment of a reaction temperature to the maximum point and furthermore copolymerization was performed, and thus, a polymer solution was obtained.

To the polymer solution was added methanol as a reaction terminator, and thus, a solution was obtained.

To the solution were added n-octadecyl-3-(3,5-di-t-butyl-4-hydroxyphenyl)-propionate and 4,6-bis(octylthiomethyl)-o-cresol as antioxidants, and thus, a solution including a rubber-like polymer was obtained. A solvent was removed from the solution including a rubber-like polymer, by steam stripping, and rubber-like polymer 6 (amount of bound styrene=45% by mass, iodine value=260, Mooney viscosity $(ML_{1+4}$ (100° C.))=45, weight average molecular weight=160,000 g/mol, content of styrene block=15% by mass, water content=0.6% by mass, ratio of change in thickness in a cold flow test=6%) was obtained.

Rubber-like polymer 6 obtained had a taper block structure represented by (R—B) (wherein R represented a conjugated diene polymer block, or a random copolymer block of vinyl aromatic hydrocarbon and conjugated diene, and B represented a vinyl aromatic hydrocarbon polymer block.).

R/B (mass ratio) in rubber-like polymer 6 obtained was 85/15.

Polymerization Example 7: Rubber-Like Polymer 7

A stainless polymerization reactor was loaded with cyclohexane as a solvent, 1,3-butadiene as a monomer, and tetrahydrofuran (THF) and 2,2-bis(2-oxolanyl)propane as polar substances.

Next, the polymerization reactor was loaded with n-butyllithium diluted with cyclohexane, as a polymerization initiator, 1,3-butadiene was polymerized, styrene as a monomer was added and furthermore polymerized after two minutes from attainment of a reaction temperature to the maximum point, and thus, a polymer solution was obtained.

To the polymer solution was added methanol as a reaction terminator, and thus, a solution was obtained.

To the solution were added n-octadecyl-3-(3,5-di-t-butyl-4-hydroxyphenyl)-propionate and 4,6-bis(octylthiomethyl)-o-cresol as antioxidants, and thus, a solution including a rubber-like polymer was obtained. A solvent was removed from the solution including a rubber-like polymer, by steam stripping, and rubber-like polymer 7 (amount of bound styrene=25% by mass, iodine value=350, Mooney viscosity $(ML_{1+4}$ (100° C.))=65, weight average molecular weight=130,000 g/mol, content of styrene block=25% by mass, water content=0.7% by mass, ratio of change in thickness in a cold flow test=7%) was obtained.

Rubber-like polymer 7 obtained had a complete block structure represented by (R—B) (wherein R represented a conjugated diene polymer block, and B represented a vinyl aromatic hydrocarbon polymer block.).

R/B (mass ratio) in rubber-like polymer 7 obtained was 75/25.

Polymerization Example 8: Rubber-Like Polymer 8

A stainless polymerization reactor was loaded with cyclohexane as a solvent, 1,3-butadiene and styrene as monomers, and tetrahydrofuran (THF) and 2,2-bis(2-oxolanyl)propane as polar substances.

Next, the polymerization reactor was loaded with n-butyllithium diluted with cyclohexane, as a polymerization initiator, 1,3-butadiene and styrene were copolymerized, styrene as a monomer was added after two minutes from attainment of a reaction temperature to the maximum point and furthermore copolymerization was performed, and thus, a polymer solution was obtained.

To the polymer solution was added methanol as a reaction terminator, and thus, a solution was obtained.

To the solution were added n-octadecyl-3-(3,5-di-t-butyl-4-hydroxyphenyl)-propionate and 4,6-bis(octylthiomethyl)-o-cresol as antioxidants, and thus, a solution including a rubber-like polymer was obtained. A solvent was removed from the solution including a rubber-like polymer, by steam stripping, and rubber-like polymer 8 (amount of bound styrene=45% by mass, iodine value=260, Mooney viscosity $(ML_{1+4}$ (100° C.))=150, weight average molecular weight=330,000 g/mol, content of styrene block=30% by mass, water content=0.7% by mass, ratio of change in thickness in a cold flow test=1%) was obtained.

Rubber-like polymer 8 obtained had a taper block structure represented by (R—B) (wherein R represented a conjugated diene polymer block, or a random copolymer block of vinyl aromatic hydrocarbon and conjugated diene, and B represented a vinyl aromatic hydrocarbon polymer block.).

R/B (mass ratio) in rubber-like polymer 8 obtained was 70/30.

Polymerization Example 9: Rubber-Like Polymer 9

A stainless polymerization reactor was loaded with cyclohexane as a solvent, 1,3-butadiene and styrene as monomers, and tetrahydrofuran (THF) and 2,2-bis(2-oxolanyl)propane as polar substances.

Next, the polymerization reactor was loaded with n-butyllithium diluted with cyclohexane, as a polymerization initiator, 1,3-butadiene and styrene were copolymerized, 1,3-butadiene as a monomer was additionally added after a certain temperature rise, furthermore 1,3-butadiene as a monomer was added after two minutes from attainment of a reaction temperature to the maximum point and furthermore copolymerization was performed, and thus, a polymer solution was obtained.

To the polymer solution was added methanol as a reaction terminator, and thus, a solution was obtained.

To the solution were added n-octadecyl-3-(3,5-di-t-butyl-4-hydroxyphenyl)-propionate and 4,6-bis(octylthiomethyl)- o-cresol as antioxidants, and thus, a solution including a rubber-like polymer was obtained. A solvent was removed from the solution including a rubber-like polymer, by steam stripping, and rubber-like polymer 9 (amount of bound styrene=45% by mass, iodine value=260, Mooney viscosity ($ML_{1+4}$ (100° C.))=55, weight average molecular weight=280,000 g/mol, content of styrene block=15% by mass, water content=0.6% by mass, ratio of change in thickness in a cold flow test=4%) was obtained.

Rubber-like polymer 9 obtained had a taper block structure represented by (R—B—R) (wherein R represented a conjugated diene polymer block, or a random copolymer block of vinyl aromatic hydrocarbon and conjugated diene, and B represented a vinyl aromatic hydrocarbon polymer block.).

R/B (mass ratio) in rubber-like polymer 9 obtained was 85/15.

Polymerization Example 10: Rubber-Like Polymer 10

A stainless polymerization reactor was loaded with cyclohexane as a solvent, 1,3-butadiene and styrene as monomers, and tetrahydrofuran (THF) and 2,2-bis(2-oxolanyl)propane as polar substances.

Next, the polymerization reactor was loaded with n-butyllithium diluted with cyclohexane, as a polymerization initiator, 1,3-butadiene and styrene were copolymerized, 1,3-butadiene as a monomer was additionally added after a certain temperature rise, furthermore styrene as a monomer was added after two minutes from attainment of a reaction temperature to the maximum point, furthermore 1,3-bis(N, N'-diglycidylaminomethyl)cyclohexane as a coupling agent was added after two minutes from attainment of a reaction temperature to the maximum point and furthermore copolymerization was performed, and thus, a polymer solution was obtained.

To the polymer solution was added methanol as a reaction terminator, and thus, a solution was obtained.

To the solution were added n-octadecyl-3-(3,5-di-t-butyl-4-hydroxyphenyl)-propionate and 4,6-bis(octylthiomethyl)-o-cresol as antioxidants, and thus, a solution including a rubber-like polymer was obtained. A solvent was removed from the solution including a rubber-like polymer, by steam stripping, and rubber-like polymer 10 (amount of bound styrene=45% by mass, iodine value=260, Mooney viscosity ($ML_{1+4}$ (100° C.))=70, weight average molecular weight=320,000 g/mol, content of styrene block=10% by mass, water content=0.7% by mass, ratio of change in thickness in a cold flow test=2%) was obtained.

Rubber-like polymer 10 obtained had a taper block structure represented by (R—B)$_n$—X (wherein R represented a conjugated diene polymer block, or a random copolymer block of vinyl aromatic hydrocarbon and conjugated diene, B represented a vinyl aromatic hydrocarbon polymer block, n was 4, and X represented a residue of a coupling agent or a modifier.).

R/B (mass ratio) in rubber-like polymer 10 obtained was 90/10.

Polymerization Example 11: Rubber-Like Polymer 11

A stainless polymerization reactor was loaded with cyclohexane as a solvent, 1,3-butadiene and styrene as monomers, and tetrahydrofuran (THF) and 2,2-bis(2-oxolanyl)propane as polar substances.

Next, the polymerization reactor was loaded with n-butyllithium diluted with cyclohexane, as a polymerization initiator, 1,3-butadiene and styrene were copolymerized, 1,3-butadiene as a monomer was added after a certain temperature rise and furthermore copolymerization was performed, and thus, a polymer solution was obtained.

To the polymer solution was added methanol as a reaction terminator, and thus, a solution was obtained.

To the solution were added n-octadecyl-3-(3,5-di-t-butyl-4-hydroxyphenyl)-propionate and 4,6-bis(octylthiomethyl)-o-cresol as antioxidants, and thus, a solution including a rubber-like polymer was obtained. A solvent was removed from the solution including a rubber-like polymer, by steam stripping, and rubber-like polymer 11 (amount of bound styrene=45% by mass, iodine value=260, Mooney viscosity ($ML_{1+4}$ (100° C.))=60, weight average molecular weight=250,000 g/mol, content of styrene block=5% by mass, water content=0.6% by mass, ratio of change in thickness in a cold flow test=13%) was obtained.

Rubber-like polymer 11 obtained had a taper block structure represented by (R—B) (wherein R represented a conjugated diene polymer block, or a random copolymer block of vinyl aromatic hydrocarbon and conjugated diene, and B represented a vinyl aromatic hydrocarbon polymer block.).

R/B (mass ratio) in rubber-like polymer 11 obtained was 95/5.

Polymerization Example 12: Rubber-Like Polymer 12

A stainless polymerization reactor was loaded with cyclohexane as a solvent, 1,3-butadiene and styrene as monomers, and tetrahydrofuran (THF) and 2,2-bis(2-oxolanyl)propane as polar substances.

Next, the polymerization reactor was loaded with n-butyllithium diluted with cyclohexane, as a polymerization initiator, 1,3-butadiene and styrene were copolymerized, 1,3-butadiene as a monomer was additionally added after a certain temperature rise, furthermore styrene as a monomer was added after two minutes from attainment of a reaction temperature to the maximum point and furthermore copolymerization was performed, and thus, a polymer solution was obtained.

To the polymer solution was added methanol as a reaction terminator, and thus, a solution was obtained.

To the solution was added the hydrogenation catalyst prepared in <Production Example 1> described above, a hydrogenation reaction was performed with addition of hydrogen, and thus, a solution was obtained.

To the solution were added n-octadecyl-3-(3,5-di-t-butyl-4-hydroxyphenyl)-propionate and 4,6-bis(octylthiomethyl)-o-cresol as antioxidants, and thus, a solution including a rubber-like polymer was obtained. A solvent was removed from the solution including a rubber-like polymer, by steam stripping, and rubber-like polymer 12 (amount of bound styrene=45% by mass, iodine value=65, Mooney viscosity ($ML_{1+4}$ (100° C.))=85, weight average molecular weight=160,000 g/mol, content of styrene block=15% by mass, water content=0.5% by mass, ratio of change in thickness in a cold flow test=5%) was obtained.

Rubber-like polymer 12 obtained had a taper block structure represented by (R—B) (in each formula, R represented a conjugated diene polymer block, a random copolymer block of vinyl aromatic hydrocarbon and conjugated diene, or a hydrogenated product of the conjugated diene polymer or random copolymer, and B represented a vinyl aromatic hydrocarbon polymer block.).

R/B (mass ratio) in rubber-like polymer 12 obtained was 85/15.

Polymerization Example 13: Rubber-Like Polymer 13

A stainless polymerization reactor was loaded with cyclohexane as a solvent, 1,3-butadiene and styrene as monomers, and tetrahydrofuran (THF) and 2,2-bis(2-oxolanyl)propane as polar substances.

Next, the polymerization reactor was loaded with n-butyllithium diluted with cyclohexane, as a polymerization initiator, 1,3-butadiene and styrene were copolymerized, 1,3-butadiene as a monomer was additionally added after a certain temperature rise, furthermore styrene as a monomer was added after two minutes from attainment of a reaction temperature to the maximum point and furthermore copolymerization was performed, and thus, a polymer solution was obtained.

To the polymer solution was added methanol as a reaction terminator, and thus, a solution was obtained.

To the solution was added the hydrogenation catalyst prepared in <Production Example 1> described above, a hydrogenation reaction was performed with addition of hydrogen, and thus, a solution was obtained.

To the solution were added n-octadecyl-3-(3,5-di-t-butyl-4-hydroxyphenyl)-propionate and 4,6-bis(octylthiomethyl)-o-cresol as antioxidants, and thus, a solution including a rubber-like polymer was obtained. A solvent was removed from the solution including a rubber-like polymer, by steam stripping, and rubber-like polymer 13 (amount of bound styrene=45% by mass, iodine value=13, Mooney viscosity ($ML_{1+4}$ (100° C.))=110, weight average molecular weight=160,000 g/mol, content of styrene block=15% by mass, water content=0.4% by mass, ratio of change in thickness in a cold flow test=2%) was obtained.

Rubber-like polymer 13 obtained had a taper block structure represented by (R—B) (in each formula, R represented a conjugated diene polymer block, a random copolymer block of vinyl aromatic hydrocarbon and conjugated diene, or a hydrogenated product of the conjugated diene polymer or random copolymer, and B represented a vinyl aromatic hydrocarbon polymer block.).

R/B (mass ratio) in rubber-like polymer 13 obtained was 85/15.

Polymerization Example 14: Rubber-Like Polymer 14

A stainless polymerization reactor was loaded with cyclohexane as a solvent, 1,3-butadiene as a monomer, and tetrahydrofuran (THF) and 2,2-bis(2-oxolanyl)propane as polar substances.

Next, the polymerization reactor was loaded with n-butyllithium diluted with cyclohexane, as a polymerization initiator, 1,3-butadiene was polymerized, styrene as a monomer was added and furthermore polymerized after two minutes from attainment of a reaction temperature to the maximum point, and thus, a polymer solution was obtained.

To the polymer solution was added methanol as a reaction terminator, and thus, a solution was obtained.

To the solution was added the hydrogenation catalyst prepared in <Production Example 1> described above, a hydrogenation reaction was performed with addition of hydrogen, and thus, a solution was obtained.

To the solution were added n-octadecyl-3-(3,5-di-t-butyl-4-hydroxyphenyl)-propionate and 4,6-bis(octylthiomethyl)-o-cresol as antioxidants, and a solution including a rubber-like polymer was obtained. A solvent was removed from the solution including a rubber-like polymer, by steam stripping, and rubber-like polymer 14 (amount of bound styrene=25% by mass, iodine value=247, Mooney viscosity ($ML_{1+4}$ (100° C.))=55, weight average molecular weight=130,000 g/mol, content of styrene block=25% by mass, water content=0.6% by mass, ratio of change in thickness in a cold flow test=6%) was obtained.

Rubber-like polymer 14 obtained had a complete block structure represented by (R—B) (wherein R represented a conjugated diene polymer block, a random copolymer block of vinyl aromatic hydrocarbon and conjugated diene, or a hydrogenated product of the conjugated diene polymer or random copolymer, and B represented a vinyl aromatic hydrocarbon polymer block.).

R/B (mass ratio) in rubber-like polymer 14 obtained was 75/25.

(Production of Packaged Molded Article)

Example 1

Packaged molded article 1 was obtained by molding rubber-like polymer 1 produced in <Polymerization Example 1> described above, into a rectangular parallelepiped-shaped molded article (size: W340 mm width×L680 mm length×H180 mm height), and covering the molded article with packaging film 1.

Packaging film 1 was a polyethylene film (made of low-density polyethylene, water vapor transmission rate 18 g/m²·d, thickness 50 μm, melting point 110° C.) where ellipsoidal holes (openings) of 1.5 mm longer side×1 mm shorter side were arranged at intervals of at least 20 mm or more, and was used for each of both upper and lower surfaces.

Such one packaged molded article had 1,000 openings, a total area of the openings was 5,000 mm², and a total area ratio of the openings was 0.42%.

No adhesion between bales was observed in the resultant packaged molded article, according to (Evaluation of Adhesion between Bales) described above.

No film break was observed according to (Evaluation of Breakage Resistance of Film) described above.

Condensation on the packaging film was observed after 1 day, but condensation on the packaging film completely disappeared after 1 month, according to (Evaluation of Promotion of Condensation Disappearance) described above.

Adhering of the packaging film was observed on upper and lower surfaces of the molded article, according to (Evaluation of Film Adhesiveness) described above.

Example 2

Packaged molded article 2 was produced in the same manner as in <Example 1> described above except that rubber-like polymer 2 produced in <Polymerization Example 2> described above was used instead of rubber-like polymer 1.

No adhesion between bales was observed in the resultant packaged molded article, according to (Evaluation of Adhesion between Bales) described above.

No film break was observed according to (Evaluation of Breakage Resistance of Film) described above.

Condensation on the packaging film was observed after 1 day, but condensation on the packaging film completely disappeared after 1 month, according to (Evaluation of Promotion of Condensation Disappearance) described above.

Adhering of the packaging film was observed on some of upper and lower surfaces and side surfaces of the molded article, according to (Evaluation of Film Adhesiveness) described above.

Example 3

Packaged molded article 3 was produced in the same manner as in <Example 1> described above except that rubber-like polymer 3 produced in <Polymerization Example 3> described above was used instead of rubber-like polymer 1.

No adhesion between bales was observed in the resultant packaged molded article, according to (Evaluation of Adhesion between Bales) described above.

No film break was observed according to (Evaluation of Breakage Resistance of Film) described above.

Condensation on the packaging film was observed after 1 day, but condensation on the packaging film completely disappeared after 1 month, according to (Evaluation of Promotion of Condensation Disappearance) described above.

Adhering of the packaging film was observed on some of upper and lower surfaces and side surfaces of the molded article, according to (Evaluation of Film Adhesiveness) described above.

Example 4

Packaged molded article 4 was produced in the same manner as in <Example 1> described above except that rubber-like polymer 4 produced in <Polymerization Example 4> described above was used instead of rubber-like polymer 1.

The resultant packaged molded article was subjected to (Evaluation of Adhesion between Bales) described above, and then adhesion between bales was partially observed, but the packaged molded article could be taken out from the large vessel.

No film break was observed according to (Evaluation of Breakage Resistance of Film) described above.

Condensation on the packaging film was observed after 1 day, but condensation on the packaging film completely disappeared after 1 month, according to (Evaluation of Promotion of Condensation Disappearance) described above.

Adhering of the packaging film was observed on most of upper and lower surfaces and side surfaces of the molded article, according to (Evaluation of Film Adhesiveness) described above.

Example 5

Packaged molded article 5 was produced in the same manner as in <Example 1> described above except that rubber-like polymer 5 produced in <Polymerization Example 5> was used instead of rubber-like polymer 1.

No adhesion between bales was observed in the resultant packaged molded article, according to (Evaluation of Adhesion between Bales) described above.

No film break was observed according to (Evaluation of Breakage Resistance of Film) described above.

Condensation on the packaging film was observed after 1 day, but condensation on the packaging film completely disappeared after 1 month, according to (Evaluation of Promotion of Condensation Disappearance) described above.

Adhering of the packaging film was observed on only a lower surface of the molded article, according to (Evaluation of Film Adhesiveness) described above.

Example 6

A polyethylene film where circular holes each having a radius of 2.5 mm (openings) were arranged at intervals of at least 30 mm or more was applied as packaging film 2, and used on an upper surface. On the other hand, a polyethylene film having no openings was applied and used on a lower surface. Packaged molded article 6 was produced in the same manner as in <Example 1> described above except that these films were each used on one surface instead of packaging film 1.

Such one packaged molded article had 60 openings, a total area of the openings was 1,200 mm$^2$, and a total area ratio of the openings was 0.1%.

No adhesion between bales was observed in the resultant packaged molded article, according to (Evaluation of Adhesion between Bales) described above.

No film break was observed according to (Evaluation of Breakage Resistance of Film) described above.

Condensation on the packaging film was observed after 1 day, and was also observed after 1 month, but such condensation was decreased as compared with that observed after 1 day, according to (Evaluation of Promotion of Condensation Disappearance) described above.

Adhering of the packaging film was observed on upper and lower surfaces of the molded article, according to (Evaluation of Film Adhesiveness) described above.

Example 7

Packaged molded article 7 was produced in the same manner as in <Example 1> described above except that a polyethylene film (made of low-density polyethylene, water vapor transmission rate 18 g/m$^2$·d, thickness 50 μm, melting point 110° C.) where ellipsoidal holes (openings) of 1.5 mm longer side×1 mm shorter side were arranged at intervals of at least 10 mm or more was applied as packaging film 3, and was used instead of packaging film 1.

Such one packaged molded article had 2,000 openings, a total area of the openings was 10,000 mm$^2$, and a total area ratio of the openings was 0.83%.

No adhesion between bales was observed in the resultant packaged molded article, according to (Evaluation of Adhesion between Bales) described above.

No film break was observed according to (Evaluation of Breakage Resistance of Film) described above.

Condensation on the packaging film was observed after 1 day, but condensation on the packaging film completely disappeared after 1 month, according to (Evaluation of Promotion of Condensation Disappearance) described above.

Adhering of the packaging film was observed on upper and lower surfaces of the molded article, according to (Evaluation of Film Adhesiveness) described above.

Example 8

Packaged molded article 8 was produced in the same manner as in <Example 1> described above except that a polyethylene film having no openings (made of low-density polyethylene, water vapor transmission rate 18 g/m²·d, thickness 50 μm, melting point 110° C.) was used for one lower surface instead of packaging film 1.

Such one packaged molded article had 500 openings, a total area of the openings was 2,500 mm², and a total area ratio of the openings was 0.21%.

No adhesion between bales was observed in the resultant packaged molded article, according to (Evaluation of Adhesion between Bales) described above.

No film break was observed according to (Evaluation of Breakage Resistance of Film) described above.

Condensation on the packaging film was observed after 1 day, and was also observed after 1 month, but such condensation was decreased as compared with that observed after 1 day, according to (Evaluation of Promotion of Condensation Disappearance) described above.

Adhering of the packaging film was observed on upper and lower surfaces of the molded article, according to (Evaluation of Film Adhesiveness) described above.

Example 9

Packaged molded article 9 was produced in the same manner as in <Example 1> described above except that a polyethylene film (made of low-density polyethylene, water vapor transmission rate 18 g/m²·d, thickness 50 μm, melting point 110° C.) where circular holes (openings) each having a radius of 2.5 mm were arranged at intervals of at least 20 mm or more was applied as packaging film 4 and was used instead of packaging film 1.

Such one packaged molded article had 1,000 openings, a total area of the openings was 20,000 mm², and a total area ratio of the openings was 1.67%.

No adhesion between bales was observed in the resultant packaged molded article, according to (Evaluation of Adhesion between Bales) described above.

No film break was observed according to (Evaluation of Breakage Resistance of Film) described above.

Condensation on the packaging film was observed after 1 day, but condensation on the packaging film completely disappeared after 1 month, according to (Evaluation of Promotion of Condensation Disappearance) described above.

Adhering of the packaging film was observed on upper and lower surfaces of the molded article, according to (Evaluation of Film Adhesiveness) described above.

Example 10

Packaged molded article 10 was produced in the same manner as in <Example 1> described above except that a polyethylene film (made of low-density polyethylene, water vapor transmission rate 18 g/m²·d, thickness 50 μm, melting point 110° C.) where circular holes each having a radius of 2.5 mm (openings) were arranged at intervals of at least 10 mm or more was applied as packaging film 5 and was used instead of packaging film 1.

Such one packaged molded article had 2,000 openings, a total area of the openings was 40,000 mm², and a total area ratio of the openings was 3.33%.

No adhesion between bales was observed in the resultant packaged molded article, according to (Evaluation of Adhesion between Bales) described above.

No film break was observed according to (Evaluation of Breakage Resistance of Film) described above.

Condensation on the packaging film was observed after 1 day, but condensation on the packaging film completely disappeared after 1 month, according to (Evaluation of Promotion of Condensation Disappearance) described above.

Adhering of the packaging film was observed on upper and lower surfaces of the molded article, according to (Evaluation of Film Adhesiveness) described above.

Example 11

Packaged molded article 11 was produced in the same manner as in <Example 1> described above except that a polyethylene film (made of low-density polyethylene, water vapor transmission rate 18 g/m²·d, thickness 50 μm, melting point 110° C.) where ellipsoidal holes (openings) of 1.5 mm longer side×1 mm shorter side were arranged at intervals of at least 4 mm or more was applied as packaging film 6, and was used instead of packaging film 1.

Such one packaged molded article had 10,000 openings, a total area of the openings was 50,000 mm², and a total area ratio of the openings was 4.17%.

No adhesion between bales was observed in the resultant packaged molded article, according to (Evaluation of Adhesion between Bales) described above.

No film break was observed according to (Evaluation of Breakage Resistance of Film) described above.

Condensation on the packaging film was observed after 1 day, but condensation on the packaging film completely disappeared after 1 month, according to (Evaluation of Promotion of Condensation Disappearance) described above.

Adhering of the packaging film was observed on upper and lower surfaces of the molded article, according to [Evaluation of Film Adhesiveness] described above.

Comparative Example 1

A polyethylene film (made of low-density polyethylene, water vapor transmission rate 18 g/m²·d, thickness 50 μm, melting point 110° C.) where circular holes each having a radius of 2.5 mm (openings) were arranged at intervals of at least 30 mm or more was applied as packaging film 7 and was used on an upper surface. On the other hand, a polyethylene film having no openings was applied and used on a lower surface. Packaged molded article 12 was produced in the same manner as in <Example 1> described above except that these films were each used on one surface instead of packaging film 1.

Such one packaged molded article had 6 openings, a total area of the openings was 120 mm², and a total area ratio of the openings was 0.01%.

No adhesion between bales was observed in the resultant packaged molded article, according to (Evaluation of Adhesion between Bales) described above.

No film break was observed according to (Evaluation of Breakage Resistance of Film) described above.

Condensation on the packaging film was observed after 1 day and was also observed after 1 month at a level comparable with condensation on the packaging film after 1 day, according to (Evaluation of Promotion of Condensation Disappearance) described above.

Adhering of the packaging film was observed on upper and lower surfaces of the molded article, according to (Evaluation of Film Adhesiveness) described above.

Comparative Example 2

A polyethylene film (made of low-density polyethylene, water vapor transmission rate 18 g/m²·d, thickness 50 μm, melting point 110° C.) where circular holes each having a radius of 2.5 mm (openings) were arranged at intervals of at least 50 mm or more was applied as packaging film 8 and was used on an upper surface. On the other hand, a polyethylene film having no openings (made of low-density polyethylene, water vapor transmission rate 18 g/m²·d, thickness 50 µm, melting point 110° C.) was applied and was used on a lower surface. Packaged molded article 13 was produced in the same manner as in <Example 1> described above except that these films were each used on one surface instead of packaging film 1.

Such one packaged molded article had 30 openings, a total area of the openings was 600 mm², and a total area ratio of the openings was 0.05%.

No adhesion between bales was observed in the resultant packaged molded article, according to (Evaluation of Adhesion between Bales) described above.

No film break was observed according to (Evaluation of Breakage Resistance of Film) described above.

Condensation on the packaging film was observed after 1 day and was also observed after 1 month at a level comparable with condensation on the packaging film after 1 day, according to (Evaluation of Promotion of Condensation Disappearance) described above.

Adhering of the packaging film was observed on upper and lower surfaces of the molded article, according to (Evaluation of Film Adhesiveness) described above.

Comparative Example 3

Packaged molded article 14 was produced in the same manner as in <Example 1> described above except that a polyethylene film (made of low-density polyethylene, water vapor transmission rate 18 g/m²·d, thickness 50 µm, melting point 110° C.) where circular holes each having a radius of 25 mm (openings) were arranged at intervals of at least 10 mm or more was used as packaging film 9 instead of packaging film 1.

Such one packaged molded article had 100 openings, a total area of the openings was 200,000 mm², and a total area ratio of the openings was 16.35%.

The resultant packaged molded article was subjected to (Evaluation of Adhesion between Bales) described above, and adhesion between bales was observed and the packaged molded article could not be taken out from the large vessel.

No packaged molded article could be taken out according to (Evaluation of Breakage Resistance of Film) described above, and thus only an upper portion was observed and break of the packaging film was observed.

Condensation on the packaging film was observed after 1 day, but condensation on the packaging film completely disappeared after 1 month, according to (Evaluation of Promotion of Condensation Disappearance) described above.

Adhering of the packaging film was observed on upper and lower surfaces of the molded article, according to (Evaluation of Film Adhesiveness) described above.

Comparative Example 4

A polyethylene film (made of low-density polyethylene, water vapor transmission rate 18 g/m²·d thickness 50 µm, melting point 110° C.) where rectangle holes of width of 8 mm width×24 mm length (openings) were arranged at intervals of at least 22 mm or more was applied as packaging film 10 and was used on an upper surface. On the other hand, a polyethylene film having no openings (made of low-density polyethylene, water vapor transmission rate 18 g/m²·d, thickness 50 µm, melting point 110° C.) was applied and was used on a lower surface. Packaged molded article 15 was produced in the same manner as in <Example 1> described above except that these films were each used on one surface instead of packaging film 1.

Such one packaged molded article had 39 openings, a total area of the openings was 7,500 mm², and a total area ratio of the openings was 0.63%.

No adhesion between bales was observed in the resultant packaged molded article, according to (Evaluation of Adhesion between Bales) described above.

Break of the packaging film was observed in the packaged molded article taken out, according to (Evaluation of Breakage Resistance of Film) described above.

Condensation on the packaging film was observed after 1 day, and was also observed after 1 month, but such condensation was decreased as compared with that observed after 1 day, according to (Evaluation of Promotion of Condensation Disappearance) described above.

Adhering of the packaging film was observed on upper and lower surfaces of the molded article, according to (Evaluation of Film Adhesiveness) described above.

Example 17

Packaged molded article 16 was produced in the same manner as in <Example 1> described above except that a polyethylene film (made of low-density polyethylene, water vapor transmission rate 18 g/m²·d, thickness 50 µm, melting point 110° C.) where rectangle holes (openings) of 5 mm longer side×3 mm shorter side were arranged at intervals of at least 10 mm or more was applied as packaging film 11 and was used instead of packaging film 1.

Such one packaged molded article had 10,000 openings, a total area of the openings was 150,000 mm², and a total area ratio of the openings was 12.50%.

No adhesion between bales was observed in the resultant packaged molded article, according to (Evaluation of Adhesion between Bales) described above.

No film break was observed according to (Evaluation of Breakage Resistance of Film) described above.

Condensation on the packaging film was observed after 1 day, but condensation on the packaging film completely disappeared after 1 month, according to (Evaluation of Promotion of Condensation Disappearance) described above.

Adhering of the packaging film was observed on upper and lower surfaces of the molded article, according to (Evaluation of Film Adhesiveness) described above.

Example 18

Packaged molded article 17 was produced in the same manner as in <Example 1> described above except that a polyethylene film (made of low-density polyethylene, water vapor transmission rate 18 g/m²·d, thickness 50 µm, melting point 110° C.) where rectangle holes (openings) of 8 mm longer side×4 mm shorter side were arranged at intervals of at least 60 mm or more was applied as packaging film 12 and was used instead of packaging film 1.

Such one packaged molded article had 3,000 openings, a total area of the openings was 120,000 mm², and a total area ratio of the openings was 10.00%.

No adhesion between bales was observed in the resultant packaged molded article, according to (Evaluation of Adhesion between Bales) described above.

No film break was observed according to (Evaluation of Breakage Resistance of Film) described above.

Condensation on the packaging film was observed after 1 day, but condensation on the packaging film completely disappeared after 1 month, according to (Evaluation of Promotion of Condensation Disappearance) described above.

Adhering of the packaging film was observed on upper and lower surfaces of the molded article, according to (Evaluation of Film Adhesiveness) described above.

Example 19

Packaged molded article 18 was produced in the same manner as in <Example 1> described above except that a polystyrene film (water vapor transmission rate 160 $g/m^2 \cdot d$, thickness 50 μm, melting point 240° C.) where ellipsoidal holes (openings) of 1.5 mm longer side×1 mm shorter side were arranged at intervals of at least 20 mm or more was applied as packaging film 13 and was used instead of packaging film 1.

Such one packaged molded article had 1,000 openings, a total area of the openings was 5,000 $mm^2$, and a total area ratio of the openings was 0.42%.

No adhesion between bales was observed in the resultant packaged molded article, according to (Evaluation of Adhesion between Bales) described above.

No film break was observed according to (Evaluation of Breakage Resistance of Film) described above.

Condensation on the packaging film was observed after 1 day, but condensation on the packaging film completely disappeared after 1 month, according to (Evaluation of Promotion of Condensation Disappearance) described above.

Adhering of the packaging film was observed on upper and lower surfaces of the molded article, according to (Evaluation of Film Adhesiveness) described above.

Example 20

(Molding of Rubber-Like Polymer)

Packaged molded article 19 was obtained by molding rubber-like polymer 6 produced in <Polymerization Example 6> described above, into a rectangular parallelepiped-shaped bale (size: W340 mm width×L680 mm length× H180 mm height) by the above-described method, and covering upper and lower surfaces of the resultant molded article (bale) with packaging film 1.

The packaging film of packaged molded article 19 obtained had 1,000 openings in a portion facing the molded article, a total area of the openings was 5,000 $mm^2$, and a total area ratio of the openings was 0.42%.

Packaged molded article 19 obtained was evaluated according to (Evaluation of Adhesion between Bales) described above, and then no adhesion between bales was observed.

No film break was observed, as evaluated according to (Evaluation of Breakage Resistance of Film) described above.

Condensation on the packaging film was observed after 1 day, but condensation on the packaging film completely disappeared after 1 month, as evaluated according to (Evaluation of Promotion of Condensation Disappearance) described above.

Adhering of the packaging film was observed on upper and lower surfaces of the molded article, as evaluated according to (Evaluation of Film Adhesiveness) described above.

Example 21

Packaged molded article 20 was produced in the same manner as in <Example 20> described above except that rubber-like polymer 7 produced in <Polymerization Example 7> was used instead of rubber-like polymer 6 and packaging film 13 was used instead of packaging film 1.

Packaged molded article 20 obtained was evaluated according to (Evaluation of Adhesion between Bales) described above, and then no adhesion between bales was observed.

No film break was observed, as evaluated according to (Evaluation of Breakage Resistance of Film) described above.

Condensation on the packaging film was observed after 1 day, but condensation on the packaging film completely disappeared after 1 month, as evaluated according to (Evaluation of Promotion of Condensation Disappearance) described above.

Adhering of the packaging film was observed on only a lower surface of the molded article, as evaluated according to (Evaluation of Film Adhesiveness) described above.

Example 22

Packaged molded article 21 was produced in the same manner as in <Example 20> described above except that rubber-like polymer 8 produced in <Polymerization Example 8> was used instead of rubber-like polymer 6.

Packaged molded article 21 obtained was evaluated according to (Evaluation of Adhesion between Bales) described above, and then no adhesion between bales was observed.

No film break was observed, as evaluated according to (Evaluation of Breakage Resistance of Film) described above.

Condensation on the packaging film was observed after 1 day, but condensation on the packaging film completely disappeared after 1 month, as evaluated according to (Evaluation of Promotion of Condensation Disappearance) described above.

Adhering of the packaging film was observed on upper and lower surfaces of the molded article, as evaluated according to (Evaluation of Film Adhesiveness) described above.

Example 23

Packaged molded article 22 was produced in the same manner as in <Example 21> described above except that rubber-like polymer 9 produced in <Polymerization Example 9> was used instead of rubber-like polymer 7.

Packaged molded article 22 obtained was evaluated according to (Evaluation of Adhesion between Bales) described above, and adhesion between bales was partially observed, but the packaged molded article could be taken out from the large vessel.

No film break was observed, as evaluated according to (Evaluation of Breakage Resistance of Film) described above.

Condensation on the packaging film was observed after 1 day, but condensation on the packaging film completely disappeared after 1 month, as evaluated according to (Evaluation of Promotion of Condensation Disappearance) described above.

Adhering of the packaging film was observed on only a lower surface of the molded article, as evaluated according to (Evaluation of Film Adhesiveness) described above.

Example 24

Packaged molded article 23 was produced in the same manner as in <Example 20> described above except that rubber-like polymer 10 produced in <Polymerization Example 10> described above was used instead of rubber-like polymer 6.

Packaged molded article 23 obtained was evaluated according to (Evaluation of Adhesion between Bales) described above, and then no adhesion between bales was observed.

No film break was observed, as evaluated according to (Evaluation of Breakage Resistance of Film) described above.

Condensation on the packaging film was observed after 1 day, but condensation on the packaging film completely disappeared after 1 month, as evaluated according to (Evaluation of Promotion of Condensation Disappearance) described above.

Adhering of the packaging film was observed on upper and lower surfaces of the molded article, as evaluated according to (Evaluation of Film Adhesiveness) described above.

Example 25

Packaged molded article 24 was produced in the same manner as in <Example 20> described above except that rubber-like polymer 11 produced in <Polymerization Example 11> described above was used instead of rubber-like polymer 6.

Packaged molded article 24 obtained was evaluated according to (Evaluation of Adhesion between Bales) described above, and adhesion between bales was partially observed, but the packaged molded article could be taken out from the large vessel.

No film break was observed, as evaluated according to (Evaluation of Breakage Resistance of Film) described above.

Condensation on the packaging film was observed after 1 day, but condensation on the packaging film completely disappeared after 1 month, as evaluated according to (Evaluation of Promotion of Condensation Disappearance) described above.

Adhering of the packaging film was observed on upper and lower surfaces of the molded article, as evaluated according to (Evaluation of Film Adhesiveness) described above.

Example 26

Packaged molded article 25 was produced in the same manner as in <Example 20> described above except that rubber-like polymer 12 produced in <Polymerization Example 12> described above was used instead of rubber-like polymer 6.

Packaged molded article 25 obtained was evaluated according to (Evaluation of Adhesion between Bales) described above, and then no adhesion between bales was observed.

No film break was observed, as evaluated according to (Evaluation of Breakage Resistance of Film) described above.

Condensation on the packaging film was observed after 1 day, but condensation on the packaging film completely disappeared after 1 month, as evaluated according to (Evaluation of Promotion of Condensation Disappearance) described above.

Adhering of the packaging film was observed on not only upper and lower surfaces of the molded article, but also side surfaces of the bales, as evaluated according to (Evaluation of Film Adhesiveness) described above.

Example 27

Packaged molded article 26 was produced in the same manner as in <Example 20> described above except that rubber-like polymer 13 produced in <Polymerization Example 13> described above was used instead of rubber-like polymer 6.

Packaged molded article 26 obtained was evaluated according to (Evaluation of Adhesion between Bales) described above, and then no adhesion between bales was observed.

No film break was observed, as evaluated according to (Evaluation of Breakage Resistance of Film) described above.

Condensation on the packaging film was observed after 1 day, but condensation on the packaging film completely disappeared after 1 month, as evaluated according to (Evaluation of Promotion of Condensation Disappearance) described above.

Adhering of the packaging film was observed on upper and lower surfaces of the molded article, but also side surfaces of the molded article, as evaluated according to (Evaluation of Film Adhesiveness) described above.

Example 28

Packaged molded article 27 was produced in the same manner as in <Example 21> described above except that rubber-like polymer 14 produced in <Polymerization Example 14> described above was instead of rubber-like polymer 7.

Packaged molded article 27 obtained was evaluated according to (Evaluation of Adhesion between Bales) described above, and then no adhesion between bales was observed.

No film break was observed, as evaluated according to (Evaluation of Breakage Resistance of Film) described above.

Condensation on the packaging film was observed after 1 day, but condensation on the packaging film completely disappeared after 1 month, as evaluated according to (Evaluation of Promotion of Condensation Disappearance) described above.

Adhering of the packaging film was observed on only a lower surface of the molded article, as evaluated according to (Evaluation of Film Adhesiveness) described above.

Example 29

Packaged molded article 28 was produced in the same manner as in <Example 20> described above except that packaging film 3 was used instead of packaging film 1.

The packaging film of packaged molded article 28 obtained had 2,000 openings in a portion facing the molded article (bale), a total area of the openings was 10,000 mm$^2$, and a total area ratio of the openings was 0.83%.

Packaged molded article 28 obtained was evaluated according to (Evaluation of Adhesion between Bales) described above, and then no adhesion between bales was observed.

No film break was observed, as evaluated according to (Evaluation of Breakage Resistance of Film) described above.

Condensation on the packaging film was observed after 1 day, but condensation on the packaging film completely disappeared after 1 month, as evaluated according to (Evaluation of Promotion of Condensation Disappearance) described above.

Adhering of the packaging film was observed on upper and lower surfaces of the molded article, as evaluated according to (Evaluation of Film Adhesiveness) described above.

Example 30

Packaged molded article 29 was produced in the same manner as in <Example 20> described above except that a polyethylene film having no openings was used for one lower surface instead of packaging film 1.

The packaging film of packaged molded article 29 obtained had 500 openings in a portion facing the molded article, a total area of the openings was 2,500 mm$^2$, and a total area ratio of the openings was 0.21%.

Packaged molded article 29 obtained was evaluated according to (Evaluation of Adhesion between Bales) described above, and then no adhesion between bales was observed.

No film break was observed, as evaluated according to (Evaluation of Breakage Resistance of Film) described above.

Condensation on the packaging film was observed after 1 day, and was also observed after 1 month, but such condensation was decreased as compared with that observed after 1 day, as evaluated according to (Evaluation of Promotion of Condensation Disappearance) described above.

Adhering of the packaging film was observed on upper and lower surfaces of the molded article, as evaluated according to (Evaluation of Film Adhesiveness) described above.

Example 31

Packaged molded article 30 was produced in the same manner as in <Example 20> described above except that packaging film 4 was used instead of packaging film 1.

The packaging film of packaged molded article 30 obtained had 1,000 openings in a portion facing the molded article, a total area of the openings was 20,000 mm$^2$, and a total area ratio of the openings was 1.67%.

Packaged molded article 30 obtained was evaluated according to (Evaluation of Adhesion between Bales) described above, and then no adhesion between bales was observed.

No film break was observed, as evaluated according to (Evaluation of Breakage Resistance of Film) described above.

Condensation on the packaging film was observed after 1 day, but condensation on the packaging film completely disappeared after 1 month, as evaluated according to (Evaluation of Promotion of Condensation Disappearance) described above.

Adhering of the packaging film was observed on upper and lower surfaces of the molded article, as evaluated according to (Evaluation of Film Adhesiveness) described above.

Example 32

Packaged molded article 31 was produced in the same manner as in <Example 20> described above except that packaging film 5 was used instead of packaging film 1.

The packaging film of packaged molded article 31 obtained had 2,000 openings in a portion facing the molded article, a total area of the openings was 40,000 mm$^2$, and a total area ratio of the openings was 3.33%.

Packaged molded article 31 obtained was evaluated according to (Evaluation of Adhesion between Bales) described above, and then no adhesion between bales was observed.

No film break was observed, as evaluated according to (Evaluation of Breakage Resistance of Film) described above.

Condensation on the packaging film was observed after 1 day, but condensation on the packaging film completely disappeared after 1 month, as evaluated according to (Evaluation of Promotion of Condensation Disappearance) described above.

Adhering of the packaging film was observed on upper and lower surfaces of the molded article, as evaluated according to (Evaluation of Film Adhesiveness) described above.

Example 33

Packaged molded article 32 was produced in the same manner as in <Example 20> described above except that packaging film 6 was used instead of packaging film 1.

The packaging film of packaged molded article 15 obtained had 10,000 openings in a portion facing the molded article, a total area of the openings was 50,000 mm$^2$, and a total area ratio of the openings was 4.17%.

Packaged molded article 32 obtained was evaluated according to (Evaluation of Adhesion between Bales) described above, and then no adhesion between bales was observed.

No film break was observed, as evaluated according to (Evaluation of Breakage Resistance of Film) described above.

Condensation on the packaging film was observed after 1 day, but condensation on the packaging film completely disappeared after 1 month, as evaluated according to (Evaluation of Promotion of Condensation Disappearance) described above.

Adhering of the packaging film was observed on upper and lower surfaces of the molded article, as evaluated according to (Evaluation of Film Adhesiveness) described above.

TABLE 1

|  |  |  | Example 1 | Example 2 | Example 3 | Example 4 | Example 5 |
|---|---|---|---|---|---|---|---|
| Packaged Molded Article |  |  | Packaged Molded Article 1 | Packaged Molded Article 2 | Packaged Molded Article 3 | Packaged Molded Article 4 | Packaged Molded Article 5 |
| Packaging Film Used | Packaging Film | Upper Surface | Film 1 | Film 1 | Film 1 | Film 1 | Film 1 |
|  |  | Lower Surface | Film 1 | Film 1 | Film 1 | Film 1 | Film 1 |
|  | Number of Openings (openings) | Openings | 1000 | 1000 | 1000 | 1000 | 1000 |
|  | Total Area ($mm^2$) of Openings | $mm^2$ | 5000 | 5000 | 5000 | 5000 | 5000 |
|  | Total Area Ratio of Openings | % | 0.42 | 0.42 | 0.42 | 0.42 | 0.42 |
|  | Number of Rectangular Parallelepiped Surfaces Packaged by Packaging Film Having Openings | Surface | 6 | 6 | 6 | 6 | 6 |
|  | Ratio of Portion Having No Openings of 1 $mm^2$ or more per 10,000 $mm^2$ | % | 0 | 0 | 0 | 0 | 0 |
| Rubber-like Polymer Used | Raw Material |  | Polyethylene | Polyethylene | Polyethylene | Polyethylene | Polyethylene |
|  | Rubber-like Polymer |  | Rubber-like Polymer 1 | Rubber-like Polymer 2 | Rubber-like Polymer 3 | Rubber-like Polymer 4 | Rubber-like Polymer 5 |
|  | Amount of Bound Styrene | % by mass | 15 | 10 | 26 | 15 | 15 |
|  | Styrene Block | % by mass | 1.2 | 1.1 | 1.9 | 1.4 | 1.2 |
|  | Iodine Value | I g/100 g | 400 | 85 | 70 | 400 | 400 |
|  | Ethylene Structure | % by mass | 0 | 41 | 21 | 0 | 0 |
|  | Amount of Conjugated Diene Monomer Unit | % by mass | 85 | 18 | 15 | 85 | 85 |
|  | Mooney Relaxation Ratio |  | 0.50 | 0.45 | 0.52 | 0.96 | 0.67 |
|  | Mooney Viscosity |  | 80 | 80 | 70 | 55 | 60 |
|  | Modification Ratio | % by mass | 75 | 50 | 50 | 70 | 0 |
|  | Weight Average Molecular Weight | ten thousand g/mol | 43 | 29 | 30 | 35 | 35 |
|  | Water Content | % by mass | 0.3 | 0.5 | 0.8 | 0.8 | 0.6 |
| Evaluation Results | Adhesion between Bales |  | ○ | ○ | ○ | Δ | ○ |
|  | Breakage Resistance of Film |  | ○ | ○ | ○ | ○ | ○ |
|  | Promotion of Disappearance of Condensation |  | ◎ | ◎ | ◎ | ◎ | ◎ |
|  | Film Adhesiveness |  | ○ | ◎ | ◎ | ◎ | Δ |

TABLE 2

|  |  |  | Example 6 | Example 7 | Example 8 | Example 9 | Example 10 |
|---|---|---|---|---|---|---|---|
| Packaged Molded Article |  |  | Packaged Molded Article 6 | Packaged Molded Article 7 | Packaged Molded Article 8 | Packaged Molded Article 9 | Packaged Molded Article 10 |
| Packaging Film Used | Packaging Film | Upper Surface | Film 2 | Film 3 | Film 1 | Film 4 | Film 5 |
|  |  | Lower Surface | Film Having No Openings | Film 3 | Film Having No Openings | Film 4 | Film 5 |
|  | Number of Openings (openings) | Openings | 60 | 2000 | 500 | 1000 | 2000 |
|  | Total Area ($mm^2$) of Openings | $mm^2$ | 1200 | 10000 | 2500 | 20000 | 40000 |
|  | Total Area Ratio of Openings | % | 0.10 | 0.83 | 0.21 | 1.67 | 3.33 |
|  | Number of Rectangular Parallelepiped Surfaces Packaged by Packaging Film Having Openings | Surface | 3 | 6 | 5 | 6 | 6 |
|  | Ratio of Portion Having No Openings of 1 $mm^2$ or more per 10,000 $mm^2$ | % | 59 | 0 | 46 | 0 | 0 |
| Rubber-like Polymer Used | Raw Material |  | Polyethylene | Polyethylene | Polyethylene | Polyethylene | Polyethylene |
|  | Rubber-like Polymer |  | Rubber-like Polymer 1 | Rubber-like Polymer 1 | Rubber-like Polymer 1 | Rubber-like Polymer 1 | Rubber-like Polymer 1 |
|  | Amount of Bound Styrene | % by mass | 15 | 15 | 15 | 15 | 15 |
|  | Styrene Block | % by mass | 1.2 | 1.2 | 1.2 | 1.2 | 1.2 |
|  | Iodine Value | I g/100 g | 400 | 400 | 400 | 400 | 400 |
|  | Ethylene Structure | % by mass | 0 | 0 | 0 | 0 | 0 |
|  | Amount of Conjugated Diene Monomer Unit | % by mass | 85 | 85 | 85 | 85 | 85 |
|  | Mooney Relaxation Ratio |  | 0.50 | 0.50 | 0.50 | 0.50 | 0.50 |
|  | Mooney Viscosity |  | 80 | 80 | 80 | 80 | 80 |
|  | Modification Ratio | % by mass | 75 | 75 | 75 | 75 | 75 |
|  | Weight Average Molecular Weight | ten thousand g/mol | 43 | 43 | 43 | 43 | 43 |
|  | Water Content | % by mass | 0.3 | 0.3 | 0.3 | 0.3 | 0.3 |

TABLE 2-continued

| | | | Example | | | | |
|---|---|---|---|---|---|---|---|
| | | | | Example 11 | Example 17 | Example 18 | Example 19 |
| Evaluation Results | Adhesion between Bales | | | ○ | ○ | ○ | ○ | ○ |
| | Breakage Resistance of Film | | | ○ | ○ | ○ | ○ | ○ |
| | Promotion of Disappearance of Condensation | | | ○ | ◎ | ○ | ◎ | ◎ |
| | Film Adhesiveness | | | ○ | ○ | ○ | ○ | ○ |

| | | | Example 11 | Example 17 | Example 18 | Example 19 |
|---|---|---|---|---|---|---|
| Packaged Molded Article | | | Packaged Molded Article 11 | Packaged Molded Article 16 | Packaged Molded Article 17 | Packaged Molded Article 18 |
| Packaging Film Used | Packaging Film | Upper Surface | Film 6 | Film 11 | Film 12 | Film 13 |
| | | Lower Surface | Film 6 | Film 11 | Film 12 | Film 13 |
| | Number of Openings (openings) | Openings | 10000 | 10000 | 3000 | 1000 |
| | Total Area (mm$^2$) of Openings | mm$^2$ | 50000 | 150000 | 120000 | 5000 |
| | Total Area Ratio of Openings | % | 4.17 | 12.5 | 10 | 0.42 |
| | Number of Rectangular Parallelepiped Surfaces Packaged by Packaging Film Having Openings | Surface | 6 | 6 | 6 | 6 |
| | Ratio of Portion Having No Openings of 1 mm$^2$ or more per 10,000 mm$^2$ | % | 0 | 0 | 0 | 0 |
| | Raw Material | | Polyethylene | Polyethylene | Polyethylene | Polystyrene |
| Rubber-like Polymer Used | Rubber-like Polymer | | Rubber-like Polymer 1 | Rubber-like Polymer 1 | Rubber-like Polymer 1 | Rubber-like Polymer 1 |
| | Amount of Bound Styrene | % by mass | 15 | 15 | 15 | 15 |
| | Styrene Block | % by mass | 1.2 | 1.2 | 1.2 | 1.2 |
| | Iodine Value | I g/100 g | 400 | 400.0 | 400 | 400 |
| | Ethylene Structure | % by mass | 0 | 0 | 0 | 0 |
| | Amount of Conjugated Diene Monomer Unit | % by mass | 85 | 85 | 85 | 85 |
| | Mooney Relaxation Ratio | | 0.50 | 0.5 | 0.5 | 0.5 |
| | Mooney Viscosity | | 80 | 80 | 80 | 80 |
| | Modification Ratio | % by mass | 75 | 75 | 75 | 75 |
| | Weight Average Molecular Weight | ten thousand g/mol | 43 | 43 | 43 | 43 |
| | Water Content | % by mass | 0.3 | 0.3 | 0.3 | 0.3 |
| Evaluation Results | Adhesion between Bales | | ○ | Δ | ○ | ○ |
| | Breakage Resistance of Film | | ○ | Δ | ○ | ○ |
| | Promotion of Disappearance of Condensation | | ◎ | ◎ | ◎ | ◎ |
| | Film Adhesiveness | | ○ | ○ | ○ | ○ |

TABLE 3

| | | | Example | | | |
|---|---|---|---|---|---|---|
| | | | Comparative Example 1 | Comparative Example 2 | Comparative Example 3 | Comparative Example 4 |
| Packaged Molded Article | | | Packaged Molded Article 12 | Packaged Molded Article 13 | Packaged Molded Article 14 | Packaged Molded Article 15 |
| Packaging Film Used | Packaging Film | Upper Surface | Film 7 | Film 8 | Film 9 | Film 10 |
| | | Lower Surface | Film Having No Openings | Film Having No Openings | Film 9 | Film Having No Openings |
| | Number of Openings (openings) | Openings | 5 | 30 | 100 | 39 |
| | Total Area (mm$^2$) of Openings | mm$^2$ | 100 | 600 | 200000 | 7500 |
| | Total Area Ratio of Openings | % | 0.01 | 0.05 | 16.35 | 0.63 |
| | Number of Rectangular Parallelepiped Surfaces Packaged by Packaging Film Having Openings | Surface | 1 | 3 | 6 | 3 |
| | Ratio of Portion Having No Openings of 1 mm$^2$ or more per 10,000 mm$^2$ | % | 84 | 73 | 41 | 63 |
| | Raw Material | | Polyethylene | Polyethylene | Polyethylene | Polyethylene |

TABLE 3-continued

|  |  |  | Comparative Example 1 | Comparative Example 2 | Comparative Example 3 | Comparative Example 4 |
|---|---|---|---|---|---|---|
| Rubber-like Polymer Used | Rubber-like Polymer |  | Rubber-like Polymer 1 | Rubber-like Polymer 1 | Rubber-like Polymer 1 | Rubber-like Polymer 1 |
|  | Amount of Bound Styrene | % by mass | 15 | 15 | 15 | 15 |
|  | Styrene Block | % by mass | 1.2 | 1.2 | 1.2 | 1.2 |
|  | Iodine Value | I g/100 g | 400 | 400 | 400 | 400 |
|  | Ethylene Structure | % by mass | 0 | 0 | 0 | 0 |
|  | Amount of Conjugated Diene Monomer Unit | % by mass | 85 | 85 | 85 | 85 |
|  | Mooney Relaxation Ratio |  | 0.50 | 0.50 | 0.50 | 0.50 |
|  | Mooney Viscosity |  | 80 | 80 | 80 | 80 |
|  | Modification Ratio | % by mass | 75 | 75 | 75 | 75 |
|  | Weight Average Molecular Weight | ten thousand g/mol | 43 | 43 | 43 | 43 |
|  | Water Content | % by mass | 0.3 | 0.3 | 0.3 | 0.3 |
| Evaluation Results | Adhesion between Bales |  | ○ | ○ | X | ○ |
|  | Breakage Resistance of Film |  | ○ | ○ | X | X |
|  | Promotion of Disappearance of Condensation |  | X | X | ◉ | ○ |
|  | Film Adhesiveness |  | ○ | ○ | ○ | ○ |

TABLE 4

|  |  |  | Example 20 | Example 21 | Example 22 | Example 23 | Example 24 |
|---|---|---|---|---|---|---|---|
| Packaged Molded Article |  |  | Packaged Molded Article 19 | Packaged Molded Article 20 | Packaged Molded Article 21 | Packaged Molded Article 22 | Packaged Molded Article 23 |
| Packaging Film | Packaging Film | Upper Surface | Film 1 | Film 13 | Film 1 | Film 13 | Film 1 |
|  |  | Lower Surface | Film 1 | Film 13 | Film 1 | Film 13 | Film 1 |
|  | Number of Openings | Openings | 1000 | 1000 | 1000 | 1000 | 1000 |
|  | Total Area of Openings | mm$^2$ | 5000 | 5000 | 5000 | 5000 | 5000 |
|  | Total Area Ratio of Openings | % | 0.42 | 0.42 | 0.42 | 0.42 | 0.42 |
|  | Number of Rectangular Parallelepiped Surfaces Packaged by Packaging Film Having Openings | Surface | 6 | 6 | 6 | 6 | 6 |
|  | Ratio of Portion Having No Openings of 1 mm$^2$ or more per 10,000 mm$^2$ | % | 0 | 0 | 0 | 0 | 0 |
|  | Raw Material |  | Polyethylene | Polystyrene | Polyethylene | Polystyrene | Polyethylene |
| Rubber-like Polymer | Type |  | Rubber-like Polymer 6 | Rubber-like Polymer 7 | Rubber-like Polymer 8 | Rubber-like Polymer 9 | Rubber-like Polymer 10 |
|  | Amount of Bound Styrene | % by mass | 45 | 25 | 45 | 45 | 45 |
|  | Styrene Block Content | % by mass | 15 | 25 | 30 | 15 | 10 |
|  | Iodine Value | I g/100 g | 260 | 350 | 260 | 260 | 260 |
|  | Ethylene Structure | % by mass | 0 | 0 | 0 | 0 | 0 |
|  | Conjugated Diene Monomer Unit | % by mass | 55 | 75 | 55 | 55 | 55 |
|  | Mooney Viscosity |  | 45 | 65 | 150 | 55 | 70 |
|  | Weight Average Molecular Weight | ten thousand g/mol | 16 | 13 | 33 | 28 | 32 |
|  | Water Content | % by mass | 0.6 | 0.7 | 0.7 | 0.6 | 0.7 |
|  | Ratio of Change in Thickness in Cold Flow Test | % | 6 | 7 | 1 | 4 | 2 |
| Evaluation | Adhesion between Bales |  | ○ | ○ | ○ | Δ | ○ |
|  | Breakage Resistance of Film |  | ○ | ○ | ○ | ○ | ○ |
|  | Promotion of Disappearance of Condensation |  | ◉ | ◉ | ◉ | ◉ | ◉ |
|  | Film Adhesiveness |  | ○ | Δ | ○ | Δ | ○ |

TABLE 5

|  |  |  | Example | | | |
|---|---|---|---|---|---|---|
|  |  |  | Example 25 | Example 26 | Example 27 | Example 28 |
| Packaged Molded Article |  |  | Packaged Molded Article 24 | Packaged Molded Article 25 | Packaged Molded Article 26 | Packaged Molded Article 27 |
| Packaging Film | Packaging Film | Upper Surface | Film 1 | Film 1 | Film 1 | Film 13 |
|  |  | Lower Surface | Film 1 | Film 1 | Film 1 | Film 13 |
|  | Number of Openings | Openings | 1000 | 1000 | 1000 | 1000 |
|  | Total Area of Openings | $mm^2$ | 5000 | 5000 | 5000 | 5000 |
|  | Total Area Ratio of Openings | % | 0.42 | 0.42 | 0.42 | 0.42 |
|  | Number of Rectangular Parallelepiped Surfaces Packaged by Packaging Film Having Openings | Surface | 6 | 6 | 6 | 6 |
|  | Ratio of Portion Having No Openings of 1 $mm^2$ or more per 10,000 $mm^2$ | % | 0 | 0 | 0 | 0 |
| Rubber-like Polymer | Raw Material |  | Polyethylene | Polyethylene | Polyethylene | Polystyrene |
|  | Type |  | Rubber-like Polymer 11 | Rubber-like Polymer 12 | Rubber-like Polymer 13 | Rubber-like Polymer 14 |
|  | Amount of Bound Styrene | % by mass | 45 | 45 | 45 | 25 |
|  | Styrene Block Content | % by mass | 5 | 15 | 15 | 25 |
|  | Iodine Value | I g/100 g | 260 | 65 | 13 | 247 |
|  | Ethylene Structure | % by mass | 0 | 25 | 36 | 11 |
|  | Conjugated Diene Monomer Unit | % by mass | 55 | 14 | 3 | 53 |
|  | Mooney Viscosity |  | 60 | 85 | 110 | 55 |
|  | Weight Average Molecular Weight | ten thousand g/mol | 25 | 16 | 16 | 13 |
|  | Water Content | % by mass | 0.6 | 0.5 | 0.4 | 0.6 |
|  | Ratio of Change in Thickness in Cold Flow Test | % | 13 | 5 | 2 | 6 |
| Evaluation | Adhesion between Bales |  | Δ | ◯ | ◯ | ◯ |
|  | Breakage Resistance of Film |  | ◯ | ◯ | ◯ | ◯ |
|  | Promotion of Disappearance of Condensation |  | ◉ | ◉ | ◉ | ◉ |
|  | Film Adhesiveness |  | ◯ | ◉ | ◉ | Δ |

TABLE 6

|  |  |  | Example | | | | |
|---|---|---|---|---|---|---|---|
|  |  |  | Example 29 | Example 30 | Example 31 | Example 32 | Example 33 |
| Packaged Molded Article |  |  | Packaged Molded Article 28 | Packaged Molded Article 29 | Packaged Molded Article 30 | Packaged Molded Article 31 | Packaged Molded Article 32 |
| Packaging Film | Packaging Film | Upper Surface | Film 3 | Film 1 | Film 4 | Film 5 | Film 6 |
|  |  | Lower Surface | Film 3 | Film Having No Openings | Film 4 | Film 5 | Film 6 |
|  | Number of Openings | Openings | 2000 | 500 | 1000 | 2000 | 10000 |
|  | Total Area of Openings | $mm^2$ | 10000 | 2500 | 20000 | 40000 | 50000 |
|  | Total Area Ratio of Openings | % | 0.83 | 0.21 | 1.67 | 3.33 | 4.17 |
|  | Number of Rectangular Parallelepiped Surfaces Packaged by Packaging Film Having Openings | Surface | 6 | 5 | 6 | 6 | 6 |
|  | Ratio of Portion Having No Openings of 1 $mm^2$ or more per 10,000 $mm^2$ | % | 0 | 46 | 0 | 0 | 0 |
| Rubber-like Polymer | Raw Material |  | Polyethylene | Polyethylene | Polyethylene | Polyethylene | Polyethylene |
|  | Type |  | Rubber-like Polymer 6 | Rubber-like Polymer 6 | Rubber-like Polymer 6 | Rubber-like Polymer 6 | Rubber-like Polymer 6 |
|  | Amount of Bound Styrene | % by mass | 45 | 45 | 45 | 45 | 45 |
|  | Styrene Block Content | % by mass | 15 | 15 | 15 | 15 | 15 |
|  | Iodine Value | I g/100 g | 260 | 260 | 260 | 260 | 260 |
|  | Ethylene Structure | % by mass | 0 | 0 | 0 | 0 | 0 |
|  | Conjugated Diene Monomer Unit | % by mass | 55 | 55 | 55 | 55 | 55 |
|  | Mooney Viscosity |  | 45 | 45 | 45 | 45 | 45 |
|  | Weight Average Molecular Weight | ten thousand g/mol | 16 | 16 | 16 | 16 | 16 |
|  | Water Content | % by mass | 0.6 | 0.6 | 0.6 | 0.6 | 0.6 |
|  | Ratio of Change in Thickness in Cold Flow Test | % | 6 | 6 | 6 | 6 | 6 |

TABLE 6-continued

|  |  | Example | | | | |
|---|---|---|---|---|---|---|
|  |  | Example 29 | Example 30 | Example 31 | Example 32 | Example 33 |
| Evaluation | Adhesion between Bales | ○ | ○ | ○ | ○ | ○ |
|  | Breakage Resistance of Film | ○ | ○ | ○ | ○ | ○ |
|  | Promotion of Disappearance of Condensation | ⊚ | ○ | ⊚ | ⊚ | ⊚ |
|  | Film Adhesiveness | ○ | ○ | ○ | ○ | ○ |

[Production and Characteristic Evaluation of Crosslinking Rubber Composition]

(Rubber Component)

Rubber-like polymer contained in each of packaged molded articles 1 to 5 and 12: 100 parts by mass The amount of the rubber component was expressed in terms of rubber-like polymer, excluding the packaging film, in each of the packaged molded articles, and the packaging film was also added at the same time when the crosslinking rubber composition was obtained.

(Compounding Agent)

The amount of each compounding agent described below, added, was expressed in parts by mass with respect to 100 parts by mass of the rubber component, excluding the packaging film, in each of the packaged molded articles.

Silica 1 (trade name "Ultrasil 7000GR" manufactured by Evonik Degussa, nitrogen adsorption specific surface area: 170 m$^2$/g): 50.0 parts by mass Silica 2 (trade name "Zeosil Premium 200 MP" manufactured by Rhodia, nitrogen adsorption specific surface area: 220 m$^2$/g): 25.0 parts by mass Carbon black (trade name "Seast KH (N339)" manufactured by Tokai Carbon Co., Ltd.): 5.0 parts by mass Silane coupling agent (trade name "Si75" manufactured by Evonik Degussa, bis(triethoxysilylpropyl)disulfide): 6.0 parts by mass SRAE oil (trade name "Process NC140" manufactured by JX Nippon Oil & Energy Corporation): 37.5 parts by mass Zinc powder: 2.5 parts by mass Stearic acid: 1.0 part by mass Anti-aging agent (N-(1,3-dimethylbutyl)-N'-phenyl-p-phenylenediamine): 2.0 parts by mass Sulfur: 2.2 parts by mass Vulcanization accelerator 1 (N-cyclohexyl-2-benzothiazylsulfinamide): 1.7 parts by mass Vulcanization accelerator 2 (diphenylguanidine): 2.0 parts by mass Total: 234.9 parts by mass

[Examples 12 to 16] and [Comparative Example 5]

(Kneading Method)

The above-described materials were kneaded as follows to obtain a rubber composition.

A closed kneader (having an internal capacity of 0.3 L) equipped with a temperature controller was used to knead, as first stage kneading, the raw material rubber component (rubber-like polymers 1 to 5), the fillers (silica 1, silica 2, and carbon black), the silane coupling agent, the SRAE oil, zinc powder and stearic acid under conditions of a filling rate of 65% and a rotor speed of 30 to 50 rpm.

Here, the temperature of the closed mixer was controlled to obtain the compound at a discharge temperature of 155 to 160° C.

Next, as second stage kneading, after the compound obtained as described above was cooled to room temperature, the anti-aging agent was added thereto, and the resultant was kneaded again for improving dispersibility of the silica. Also in this case, the discharge temperature of the compound was adjusted to 155 to 160° C. by the temperature control of the mixer.

After cooling, as third stage kneading, the resultant was kneaded with sulfur and the vulcanization accelerators 1 and 2 added thereto with an open roll set to 70° C., and thus a rubber composition was obtained.

Thereafter, the resultant rubber composition was molded, and vulcanized with a vulcanization press at 160° C. for 20 minutes.

The rubber composition before vulcanization and the rubber composition after the vulcanization were evaluated.

Specifically, the evaluations were performed by the following methods.

(Evaluation 1) Fuel Economy

A viscosity tester "ARES" manufactured by Rheometric Scientific was used to measure a viscosity parameter in a twist mode.

A tan δ measured at 50° C., a frequency of 10 Hz, and a strain of 3% was used as an index of fuel economy. A smaller index indicates better fuel economy.

Table 7 below shows, with the physical properties of the compound of packaged molded article 5, used as references, sings corresponding to changes of respective performances in the following ranges.

Δ: from deterioration by less than 5% to improvement by less than 5%

○: from improvement by 5% or more to improvement by less than 15%

⊚: improvement by 15% or more x: deterioration by 5% or more (Evaluation 2) Fracture Property Breaking strength and elongation at break were measured in accordance with a tensile test method of JIS K6251.

A product of measured values of the breaking strength and the elongation at break was defined as a fracture property.

Table 7 shows, with the physical property of the compound of packaged molded article 5, used as a reference, signs corresponding to changes of the respective performances in the following ranges.

Δ: from deterioration by less than 5% to improvement by less than 5%

○: from improvement by 5% or more to improvement by less than 15%

⊚: improvement by 15% or more x: deterioration by 5% or more

TABLE 7

|  |  | Example | | | | | Comparative Example 5 |
|---|---|---|---|---|---|---|---|
|  |  | Example 12 | Example 13 | Example 14 | Example 15 | Example 16 | |
| Packaged Molded Article | | Packaged Molded Article 1 | Packaged Molded Article 2 | Packaged Molded Article 3 | Packaged Molded Article 4 | Packaged Molded Article 5 | Packaged Molded Article 12 |
| Fuel Economy | Index | 130 ◎ | 133 ◎ | 110 ○ | 138 ◎ | 100 △ | 113 ○ |
| Fracture Property | Index | 105 | 140 | 138 | 98 | 100 | 92 |

As shown in Tables 1 to 6, it was confirmed that the packaged molded articles of combinations of the rubber-like polymers and the packaging films, of Examples 1 to 11 and Examples 17 to 33, exhibit the promotion effect of disappearance of condensation on the packaging film and can allow for inhibition of adhesion between bales during storage.

As shown in Table 7, it was confirmed that the rubber compositions of Examples 12 to 16, using the rubber-like polymers high in modification ratio, are excellent in fuel economy and compounds using the rubber-like polymers low in iodine value are excellent in fracture property. On the other hand, the rubber composition of Comparative Example 5 was deteriorated in balance between fuel economy performance and fracture property due to slight deterioration in dispersion of the filler. The reason for the deterioration is considered because the packaged molded article with generation of condensation is kneaded together with the film and thus the kneading is not sufficient and expected performances as exhibited in corresponding Examples cannot be exhibited.

The present application is based on Japanese Patent Application (Japanese Patent Application No. 2020-135808) filed with JPO on Aug. 11, 2020 and Japanese Patent Application (Japanese Patent Application No. 2020-161630) filed with JPO on Sep. 28, 2020, the contents of which are herein incorporated as reference.

INDUSTRIAL APPLICABILITY

The packaged molded article of the present invention is industrially applicable to, for example, a material for tire treads, interiors and exteriors of vehicles, anti-vibration rubbers, belts, shoes, foam materials, and various industrial products.

The invention claimed is:

1. A packaged molded article comprising
a molded article of a rubber-like polymer having a weight average molecular weight of 100,000 or more, and
a packaging film packaging the molded article,
wherein
a portion facing the molded article, of the packaging film, satisfies the following conditions (1) and (2):
<Condition (1)> the portion comprises 50 or more openings;
<Condition (2)> a total area ratio of the openings is 0.1% or more and 15% or less with respect to a total area of the portion facing the molded article.

2. A packaged molded article comprising
a molded article of a rubber-like polymer having a weight average molecular weight of 100,000 or more, and
a packaging film packaging the molded article,
wherein
a portion facing the molded article, of the packaging film, comprises openings, and a total area ratio of the openings is 0.1% or more and 15% or less with respect to a total area of the portion facing the molded article, and
an area ratio of a portion not having any openings of 1 mm$^2$ or more per 10,000 mm$^2$ of the packaging film is 70% or less with respect to a total area of the portion facing the molded article.

3. The packaged molded article according to claim 1, wherein
the rubber-like polymer comprises a structure represented by (R—B), (R—B—R), or (R—B)$_n$—X,
R/B (mass ratio) in the rubber-like polymer is 30/70 to 97/3, and
the rubber-like polymer has a Mooney viscosity (ML$_{1+4}$ (100° C.)) of 40 or more;
wherein, R represents a conjugated diene polymer block, a random copolymer block of vinyl aromatic hydrocarbon and conjugated diene, or a hydrogenated product block of the conjugated diene polymer block or random copolymer block, B represents a vinyl aromatic hydrocarbon polymer block, n represents an integer of 1 or more, and X represents a residue of a coupling agent or a modifier.

4. The packaged molded article according to claim 1, wherein the rubber-like polymer has a Mooney relaxation ratio (MSR) of 0.8 or less.

5. The packaged molded article according to claim 1, wherein the openings each comprise a circular or ellipsoidal shape.

6. The packaged molded article according to claim 1, wherein the packaging film satisfies the following conditions (3) and (4):
<Condition (3)> the packaging film comprises 100 or more openings in the portion facing the molded article;
<Condition (4)> a total area of the openings is 500 mm$^2$ or more and 50,000 mm$^2$ or less.

7. The packaged molded article according to claim 1, wherein the rubber-like polymer comprises a nitrogen atom.

8. The packaged molded article according to claim 1, wherein the rubber-like polymer has a modification ratio measured by column adsorption GPC of 40% by mass or more.

9. The packaged molded article according to claim 1, wherein the rubber-like polymer has an iodine value of 10 to 250, and 3% by mass or more of an ethylene structure.

10. The packaged molded article according to claim 1, wherein
a molded article of the rubber-like polymer is a rectangular parallelepiped, and
the packaging film faces at least three surfaces of the rectangular parallelepiped and comprises openings in each of the surfaces.

11. The packaged molded article according to claim 1, wherein
the packaging film is a monolayer film formed from one selected from the group consisting of a polyethylene resin, a polystyrene resin, a nylon resin, a polyethylene terephthalate resin and an ethylene vinyl alcohol copolymer, or a multilayer film formed from two or more selected from the group.

12. The packaged molded article according to claim 1, wherein the packaging film has a water vapor transmission rate at 40° C. and 90% RH of 5 g/m²·d or more.

13. A crosslinking rubber composition as a mixture of
the packaged molded article according to claim 1, and
0.1 parts by mass or more and 20 parts by mass or less of a crosslinking agent with respect to a total amount of 100 parts by mass of a rubber component in the packaged molded article.

14. A method for producing a packaged molded article, comprising
a step of polymerizing a monomer in a solution to obtain a solution comprising a rubber-like polymer having a weight average molecular weight of 100,000 or more,
a step of removing a solvent from the solution comprising the rubber-like polymer,
a step of molding the rubber-like polymer to obtain a molded article, and
a step of covering the molded article with a packaging film, wherein
a portion facing the molded article, of the packaging film, satisfies the following conditions (1) and (2):
<Condition (1)> the portion comprises 50 or more openings,
<Condition (2)> a total area ratio of the openings is 0.1% or more and 15% or less with respect to a total area of the portion facing the molded article.

15. A method for producing a crosslinking rubber composition, comprising
a step of processing the packaged molded article according to claim 1 without peeling of the packaging film contained in the packaged molded article.

16. A tread for a tire, comprising the packaged molded article according to claim 1.

17. A tread for a tire, comprising the crosslinking rubber composition according to claim 13.

* * * * *